United States Patent
Krendzel et al.

(10) Patent No.: US 10,631,227 B2
(45) Date of Patent: Apr. 21, 2020

(54) NETWORK ENTITY FOR GEOGRAPHICALLY ROUTING A DATA PACKET TOWARDS A MOBILE DEVICE OVER A COMMUNICATION NETWORK

(71) Applicant: HUAWEI TECHNOLOGIES CO., LTD., Shenzhen, Guangdong (CN)

(72) Inventors: Andrey Krendzel, Helsinki (FI); Philip Ginzboorg, Helsinki (FI); Xavier Gelabert, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 8 days.

(21) Appl. No.: 15/469,726

(22) Filed: Mar. 27, 2017

(65) Prior Publication Data
US 2017/0201926 A1    Jul. 13, 2017

Related U.S. Application Data

(63) Continuation of application No. PCT/EP2014/071788, filed on Oct. 10, 2014.

(51) Int. Cl.
| | |
|---|---|
| H04W 40/20 | (2009.01) |
| H04W 4/02 | (2018.01) |
| H04W 40/24 | (2009.01) |
| H04L 12/733 | (2013.01) |
| H04W 4/029 | (2018.01) |

(52) U.S. Cl.
CPC ............ H04W 40/20 (2013.01); H04L 45/126 (2013.01); H04W 4/029 (2018.02); H04W 40/24 (2013.01)

(58) Field of Classification Search
CPC ....... H04W 40/20; H04W 4/02; H04W 40/24; H04W 4/029; H04L 45/126
See application file for complete search history.

(56) References Cited

U.S. PATENT DOCUMENTS

| | | | |
|---|---|---|---|
| 7,010,306 B1* | 3/2006 | Tanibayashi | H04W 8/08 455/456.1 |
| 8,050,256 B1 | 11/2011 | Bao et al. | |
| 8,050,356 B2 | 11/2011 | Nam et al. | |
| 2001/0051525 A1* | 12/2001 | Rayne | H04W 8/085 455/453 |
| 2002/0155825 A1* | 10/2002 | Haunnont | G06Q 30/0267 455/412.1 |
| 2005/0059409 A1* | 3/2005 | Vare | H04W 4/029 455/456.1 |
| 2005/0190717 A1 | 9/2005 | Shu et al. | |

(Continued)

FOREIGN PATENT DOCUMENTS

| | | |
|---|---|---|
| CN | 1809210 A | 7/2006 |
| CN | 101374087 A | 2/2009 |

(Continued)

OTHER PUBLICATIONS

W. Tong, "Huawei Invests in 5G Networks", Jul. 2013, 2 pages.

(Continued)

*Primary Examiner* — Andrew Lai
*Assistant Examiner* — Harry H Kim
(74) *Attorney, Agent, or Firm* — Leydig, Voit & Mayer, Ltd.

(57) ABSTRACT

The invention relates to a network entity for geographically routing a data packet towards a mobile device over a communication network.

14 Claims, 12 Drawing Sheets

(56) References Cited

U.S. PATENT DOCUMENTS

| | | | |
|---|---|---|---|
| 2007/0259624 | A1* | 11/2007 | Alizadeh-Shabdiz ............... G01S 11/02 455/67.11 |
| 2008/0072063 | A1* | 3/2008 | Takahashi ............. H04L 9/0866 713/186 |
| 2010/0103873 | A1 | 4/2010 | Buracchini et al. |
| 2011/0158232 | A1 | 6/2011 | Nesbitt et al. |
| 2011/0287785 | A1* | 11/2011 | Hu ............................ H04W 8/08 455/456.2 |
| 2012/0014316 | A1* | 1/2012 | Rahman ............... H04W 40/246 370/328 |
| 2012/0238275 | A1 | 9/2012 | Galwas et al. |
| 2012/0302232 | A1 | 11/2012 | Rosenblatt et al. |
| 2013/0128755 | A1* | 5/2013 | Ullah ........................ G01S 5/02 370/252 |
| 2014/0031011 | A1 | 1/2014 | West |
| 2014/0140203 | A1* | 5/2014 | Lynar .................... H04W 40/38 370/225 |
| 2014/0269331 | A1 | 9/2014 | Pfeifer et al. |
| 2015/0116360 | A1* | 4/2015 | Jones ..................... G06T 11/60 345/634 |
| 2017/0243211 | A1* | 8/2017 | Dimmick ............... G06Q 20/40 |
| 2018/0132075 | A1* | 5/2018 | Chen ................. H04W 36/0011 |

FOREIGN PATENT DOCUMENTS

| | | |
|---|---|---|
| CN | 101702964 A | 5/2010 |
| CN | 102868983 A | 1/2013 |
| CN | 103425381 A | 12/2013 |
| CN | 103581166 A | 2/2014 |
| EA | 200701644 A1 | 2/2008 |
| EP | 2536071 A1 | 12/2012 |
| JP | 2013522980 A | 6/2013 |

OTHER PUBLICATIONS

M. Olsson, et al., "SAE and the Evolved Packet Core: Driving the mobile broadband revolution", Elsevier, 2009.

3GPP TS 36.300, "Evolved Universal Terrestrial Radio Access (E-UTRA) and Evolved Universal Terrestrial Radio Access Network (E-UTRAN); Overall description", V11.7.0, Sep. 2013, 209 pages.

3GPP TS 23.401, "General Packet Radio Service (GPRS) enhancements for Evolved Universal Terrestrial Radio Access Network (E-UTRAN) access", V12.2.0, Sep. 2013, 293 pages.

3GPP TR 36.932, "Scenarios and requirements for small cell enhancements for E-UTRA and E-UTRAN", V12.1.0, Mar. 2013, 14 pages.

J.G. Andrews, et al., "What will 5G be?", IEEE JSAC Special Issue on 5G Wireless Communication Systems, May 2014, 18 pages.

M. Mauve, J. Widmer, and H. Hartenstein, A survey on position-based routing in mobile ad hoc networks. IEEE Network, 15: 30-39, Dec. 2001, 10 pages.

T.Camp. Location services in Mobile Ad-hoc Networks, "Handbook of algorithms for wireless networking and mobile computing", 14: 319-341, 2006, 983 pages.

A. Krendzel, J. Mangues, M. Requena, J. Núñez, "VIMLOC: Virtual Home Region Multi-Hash Location Service in Wireless Mesh Networks", in proc. the IFIP/IEEE Wireless Days conference, UAE, Nov. 24-27, 2008, 6 pages.

V. W.-S. Wong, and C. M. V. Leung, "Location Management for Next-Generation Personal Communications Networks". IEEE Network, pp. 18-24, Sep./Oct. 2000, 7 pages.

C. Phillips, et al., "Practical Radio Environment Mapping with Geostatistics", in proc. the Dyspan-2012, 12 pages.

* cited by examiner

US 10,631,227 B2

NETWORK ENTITY FOR GEOGRAPHICALLY ROUTING A DATA PACKET TOWARDS A MOBILE DEVICE OVER A COMMUNICATION NETWORK

CROSS-REFERENCE TO RELATED APPLICATIONS

This application is a continuation of International Application No. PCT/EP2014/071788, filed on Oct. 10, 2014, the disclosure of which is hereby incorporated by reference in its entirety.

TECHNICAL FIELD

The invention relates to the field of data packet routing and mobility management in communication networks.

BACKGROUND

Modern communication networks can be designed according to a hierarchical structure, wherein there are many-to-one relationships, e.g. between access nodes (base stations) and a serving gateway, and a one-to-one relationship, e.g. between the serving gateway and a data packet gateway, towards an external IP network.

A mobility management functionality of the communication network can be responsible to ensure that a mobile device attached to the communication network can be reached, for example, to notify the mobile device about incoming data packets or calls. The total area covered by the communication network can be subdivided into tracking areas (TAs). When there is no data packet to be sent or to be received, the mobile device can be in idle mode in order to save energy and network resources. In idle mode, the communication network may no longer entail the mobile device to inform the communication network every time the mobile device moves from one base station to another base station within a TA, and the mobile device can be in an energy saving state.

In order to search for the idle mobile device and to establish a communication link, a paging procedure can be applied. Paging messages can be broadcasted periodically on a common paging channel for this purpose. A paging message can e.g. comprise a number of the tracking area (TA) and identifications of mobile devices that are, or may be, in the tracking area (TA). The paging procedure can be triggered, for example, by downlink data packets arriving at the serving gateway from the data packet gateway. The mobile device may wake up to receive the paging message. Consequently, the communication link can be established and the data packet can be delivered to the mobile device.

In densely structured communication networks, however, this approach may lead to a reduced efficiency due to a large signaling overhead throughout the communication network.

SUMMARY

It is an object of the invention to provide an efficient concept for routing a data packet towards a mobile device over a communication network.

This object is achieved by the features of the independent claims. Further implementation forms are apparent from the dependent claims, the description and the figures.

Embodiments of the invention are based on the finding that a geographic routing of the data packet can be employed, wherein the data packet comprises an identification of the mobile device and a geographic coordinate indicating a geographic position of the mobile device.

A network entity receiving the data packet can extract the identification of the mobile device from the data packet, and can compare the identification of the mobile device with a number of identifications of a number of mobile devices arranged within a geographic/radio neighborhood of the network entity. The network entity can further replace the geographic coordinate in the data packet by a more up-to-date geographic coordinate of the mobile device, and can route the data packet towards the mobile device upon the basis of the updated geographic coordinate. A gateway entity can be employed to provide the data packet for geographic routing towards the mobile device.

According to a first aspect, the invention relates to a network entity for geographically routing a data packet towards a mobile device over a communication network, the data packet comprising an identification of the mobile device and a geographic coordinate indicating a geographic position of the mobile device, the network entity comprising a communication interface being configured to receive the data packet over the communication network, and to extract the identification of the mobile device from the data packet, a database being configured to store a number of identifications of a number of mobile devices together with a number of geographic coordinates indicating geographic positions of the number of mobile devices, each identification being associated to a geographic coordinate, and a processor being configured to compare the extracted identification of the mobile device with the number of identifications, and to replace the geographic coordinate in the data packet by a geographic coordinate associated with an identification if the extracted identification corresponds to the identification to obtain a modified data packet, wherein the communication interface is configured to transmit the modified data packet towards the mobile device. Thus, an efficient concept for routing a data packet towards a mobile device over a communication network can be realized.

The network entity can comprise an access node and a backhaul node, or a combined access node and backhaul node. The network entity can comprise a router, or a switch. The network entity can e.g. comprise an evolved node B (eNodeB), a base station, or a small low power access node (e.g. for covering a small cell). The data packet can comprise a data packet header comprising the identification of the mobile device and the geographic coordinate indicating the geographic position of the mobile device. The mobile device can e.g. be formed by a user node (UNd), a user equipment (UE), or a user terminal. The identification of the mobile device can be an identifier or an identity of the mobile device.

The communication interface can further be configured to extract the geographic coordinate from the data packet. The processor can be configured to replace the geographic coordinate in the data packet by the geographic coordinate associated with the identification, if the extracted geographic coordinate and the geographic coordinate associated with the identification are different.

The database of the network entity can be referred to as a local database. The geographic positions of the number of mobile devices can be current geographic positions of the number of mobile devices or geographic positions of centers of local clusters associated to the number of mobile devices. In case the geographic position or geographic coordinate of the mobile device is not known or not available, the data packet can be transmitted towards a geographic position of a center of a local cluster associated to the mobile device.

The local cluster associated to the mobile device can comprise stable network entities. The number of mobile devices can relate to at least one mobile device.

The communication network can comprise an upstream communication network and a downstream communication network. The communication network can further comprise a backhaul or backbone communication network and a mobile communication network. The transmission of the modified data packet towards the mobile device can comprise routing the modified data packet towards a further network entity associated with an updated geographic coordinate.

The geographical routing can be performed upon the basis of a geographical routing protocol. The geographical routing protocol can use the geographic coordinate in the data packet for data packet delivery. The geographical routing protocol can comprise a combined geographical and topological routing protocol. The geographical routing protocol can be referred to as a geographical forwarding protocol. The geographical routing protocol can comprise a greedy forwarding protocol, a face routing protocol, a greedy perimeter stateless routing (GPSR) protocol, a restricted directional flooding protocol, and/or a combined geographical and topological routing protocol.

The overall approach can provide a geographic position to deliver the data packet successfully to the mobile device by means of an underlying routing strategy and/or routing protocol using geographical information. There are different titles of these protocols, e.g. greedy forwarding, or face routing. The terms routing and forwarding can be applied equivalently. The location management scheme can be transparent and/or orthogonal from the viewpoint of an underlying data packet routing and/or forwarding strategy.

In a first implementation form of the network entity according to the first aspect as such, the communication interface is configured to transmit the data packet towards the mobile device if the extracted identification does not correspond to an identification of the number of identifications. Thus, a geographical routing of the unmodified data packet towards the mobile device can be realized.

In a second implementation form of the network entity according to the first aspect as such or the first implementation form of the first aspect, the mobile device is associated with another network entity, wherein the communication interface is configured to transmit the modified data packet towards the other network entity. Thus, a geographical routing of the data packet towards the mobile device can be performed efficiently, e.g. by packet diverting.

In a third implementation form of the network entity according to the first aspect as such or any preceding implementation form of the first aspect, the communication interface is configured to receive a number of beacon signals from a number of mobile devices, wherein the processor is configured to determine a number of identifications of the number of mobile devices together with a number of geographic coordinates indicating geographic positions of the number of mobile devices upon the basis of the number of beacon signals, and wherein the processor is configured to store the determined number of identifications together with the determined number of geographic coordinates into the database. Thus, an updating of the database can be realized efficiently. The database can be referred to as a local database.

The processor can be configured to identify and/or to localize the number of mobile devices upon the basis of the number of beacon signals.

In a fourth implementation form of the network entity according to the first aspect as such or any preceding implementation form of the first aspect, the communication network comprises a gateway entity, wherein the processor is configured to retrieve an identification together with a geographic coordinate from the database, and wherein the communication interface is configured to transmit the retrieved identification together with the retrieved geographic coordinate towards the gateway entity. Thus, an updating of a database associated to the gateway entity can be realized efficiently.

The network entity can be a primary network entity, e.g. comprising a primary access node and a corresponding primary backhaul node. The primary network entity can be selected from a plurality of network entities by the gateway entity.

In a fifth implementation form of the network entity according to the fourth implementation form of the first aspect, the communication interface is configured to receive a request signal from the gateway entity, wherein the processor is configured to retrieve the identification together with the geographic coordinate from the database upon reception of the request signal, and wherein the communication interface is configured to transmit the retrieved identification together with the retrieved geographic coordinate towards the gateway entity upon reception of the request signal. Thus, an updating of a database associated to the gateway entity can be realized efficiently.

The request signal can be employed for triggering the updating of the database associated to the gateway entity. The database of the network entity and the database associated to the gateway entity can have different trigger conditions for updating. The database associated to the gateway entity can be updated less frequently than the database of the network entity in order to reduce a signaling overhead through the communication network.

In a sixth implementation form of the network entity according to the fourth implementation form of the first aspect, the processor is configured to periodically retrieve the identification together with the geographic coordinate from the database, wherein the communication interface is configured to periodically transmit the retrieved identification together with the retrieved geographic coordinate towards the gateway entity. Thus, an updating of a database associated to the gateway entity can be realized efficiently.

In a seventh implementation form of the network entity according to the first aspect as such or any preceding implementation form of the first aspect, the communication network comprises a plurality of further network entities, wherein the processor is configured to retrieve an identification together with a geographic coordinate from the database, and wherein the communication interface is configured to transmit the retrieved identification together with the retrieved geographic coordinate towards a further network entity of the plurality of further network entities. Thus, an updating of a database associated to the further network entity can be realized efficiently.

The network entity and the further network entity can form a local cluster associated to a mobile device. The local cluster can comprise network entities within a geographical and/or radio neighborhood of the number of mobile devices. The local cluster can be determined based on signal strengths of received beacon signals from the number of mobile devices. If a mobile device moves, an associated local cluster can move together with the mobile device. The network entities within the neighborhood of the mobile device can change.

In an eighth implementation form of the network entity according to the first aspect as such or any preceding implementation form of the first aspect, the communication network comprises a plurality of further network entities, wherein the communication interface is configured to receive an identification together with a geographic coordinate from a further network entity of the plurality of further network entities, and wherein the processor is configured to store the received identification together with the received geographic coordinate into the database. Thus, an updating of the database of the network entity by the further network entity can be realized efficiently. The network entity and the further network entity can form a local cluster associated to a mobile device.

In a ninth implementation form of the network entity according to the first aspect as such or any preceding implementation form of the first aspect, the network entity comprises a backhaul node and an access node, wherein the backhaul node is configured to communicate with a plurality of further network entities or a gateway entity of the communication network, and wherein the access node is configured to communicate with the number of mobile devices. Thus, a communication of the network entity with the plurality of further network entities, the gateway entity, and the number of mobile devices can be performed efficiently.

The backhaul node and the access node can be associated logically and/or physically. The backhaul node and the access node can be connected by a wired connection and/or a wireless connection. The access node and the associated backhaul node(s) can be implemented physically in one physical equipment.

According to a second aspect, the invention relates to a gateway entity for geographically routing a data packet towards a mobile device over a communication network, the data packet comprising an identification of the mobile device, the gateway entity comprising a communication interface being configured to receive the data packet, and to extract the identification of the mobile device from the data packet, and a processor being configured to compare the extracted identification of the mobile device with a number of identifications of a number of mobile devices, and to append a geographic coordinate to the data packet associated with an identification if the extracted identification corresponds to the identification to obtain a modified data packet, wherein the communication interface is configured to transmit the modified data packet towards the mobile device based on the geographic coordinate appended to the data packet. Thus, an efficient concept for routing a data packet towards a mobile device over a communication network can be realized.

The communication interface can be configured to transmit the modified data packet towards a plurality of network entities. The processor can be configured to derive the geographic coordinate associated to the extracted identification of the mobile device. The data packet can arrive from an external IP network at the gateway entity.

In a first implementation form of the gateway entity according to the second aspect as such, the gateway entity further comprises a database being configured to store the number of identifications of the number of mobile devices together with a number of geographic coordinates indicating geographic positions of the number of mobile devices, each identification being associated to a geographic coordinate. Thus, the number of identifications of the number of mobile devices together with the number of geographic coordinates can be provided efficiently.

The database can be referred to as a remote database. The geographic positions of the number of mobile devices can be current geographic positions. The geographic positions of the number of mobile devices can be outdated.

In a second implementation form of the gateway entity according to the first implementation form of the second aspect, the communication network comprises a plurality of network entities, wherein the communication interface is configured to receive an identification together with a geographic coordinate from a network entity of the plurality of network entities, and wherein the processor is configured to store the received identification together with the received geographic coordinate into the database. Thus, an updating of the database associated to the gateway entity by the network entity can be realized efficiently.

In a third implementation form of the gateway entity according to the second implementation form of the second aspect, the communication interface is configured to transmit a request signal towards the network entity of the plurality of network entities, wherein the communication interface is configured to receive the identification together with the geographic coordinate from the network entity of the plurality of network entities upon transmission of the request signal, and wherein the processor is configured to store the received identification together with the received geographic coordinate into the database upon transmission of the request signal. Thus, an updating of the database associated to the gateway entity can be triggered by the gateway entity.

In a fourth implementation form of the gateway entity according to the first implementation form to the third implementation form of the second aspect, the processor is configured to determine a number of future geographic coordinates indicating future geographic positions of the number of mobile devices upon the basis of the number of geographic coordinates, and to store the determined number of future geographic coordinates into the database, each identification being associated to a future geographic coordinate. Thus, future geographic coordinates can be considered for routing the data packet towards the mobile device.

The number of future geographic coordinates can be determined using a position prediction technique. The number of future geographic coordinates can further be determined upon the basis of movement directions and/or movement speeds of the number of mobile devices.

In a fifth implementation form of the gateway entity according to the fourth implementation form of the second aspect, the processor is configured to compare the extracted identification of the mobile device with the number of identifications, and to append a future geographic coordinate associated with an identification to the data packet if the extracted identification corresponds to the identification to obtain a further modified data packet, wherein the communication interface is configured to transmit the further modified data packet additionally to the modified data packet towards the mobile device based on the future geographic coordinate appended to the data packet. Thus, a diversion of the data packet can be realized efficiently.

The data packet can be duplicated by the processor. The modified data packet can be routed towards a current geographic position of the mobile device. The further modified data packet can be routed towards a future geographic position of the mobile device.

According to a third aspect, the invention relates to a method for geographically routing a data packet towards a mobile device over a communication network, the data packet comprising an identification of the mobile device and a geographic coordinate indicating a geographic position of the mobile device, the method comprising receiving the data packet over the communication network, extracting the identification of the mobile device from the data packet, storing a number of identifications of a number of mobile devices together with a number of geographic coordinates indicating geographic positions of the number of mobile devices, each identification being associated to a geographic coordinate, comparing the extracted identification of the mobile device with the number of identifications, replacing the geographic coordinate in the data packet by a geographic coordinate associated with an identification if the extracted identification corresponds to the identification to obtain a modified data packet, and transmitting the modified data packet towards the mobile device. Thus, an efficient concept for routing a data packet towards a mobile device over a communication network can be realized.

The method can be performed by the network entity. Further features of the method can directly result from the functionality of the network entity.

In a first implementation form of the method according to the third aspect as such, the method comprises transmitting the data packet towards the mobile device if the extracted identification does not correspond to an identification of the number of identifications. Thus, a geographical routing of the unmodified data packet towards the mobile device can be realized.

In a second implementation form of the method according to the third aspect as such or the first implementation form of the third aspect, the mobile device is associated with another network entity, wherein the method comprises transmitting the modified data packet towards the other network entity. Thus, a geographical routing of the data packet towards the mobile device can be performed efficiently.

In a third implementation form of the method according to the third aspect as such or any preceding implementation form of the third aspect, the method comprises receiving a number of beacon signals from a number of mobile devices, determining a number of identifications of the number of mobile devices together with a number of geographic coordinates indicating geographic positions of the number of mobile devices upon the basis of the number of beacon signals, and storing the determined number of identifications together with the determined number of geographic coordinates into a database. Thus, an updating of the database can be realized efficiently.

In a fourth implementation form of the method according to the third aspect as such or any preceding implementation form of the third aspect, the communication network comprises a gateway entity, wherein the method comprises retrieving an identification together with a geographic coordinate from a database, and transmitting the retrieved identification together with the retrieved geographic coordinate towards the gateway entity. Thus, an updating of a database associated to the gateway entity can be realized efficiently.

In a fifth implementation form of the method according to the fourth implementation form of the third aspect, the method comprises receiving a request signal from the gateway entity, retrieving the identification together with the geographic coordinate from the database upon reception of the request signal, and transmitting the retrieved identification together with the retrieved geographic coordinate towards the gateway entity upon reception of the request signal. Thus, an updating of a database associated to the gateway entity can be realized efficiently.

In a sixth implementation form of the method according to the fourth implementation form of the third aspect, the method comprises periodically retrieving the identification together with the geographic coordinate from the database, and periodically transmitting the retrieved identification together with the retrieved geographic coordinate towards the gateway entity. Thus, an updating of a database associated to the gateway entity can be realized efficiently.

In a seventh implementation form of the method according to the third aspect as such or any preceding implementation form of the third aspect, the communication network comprises a plurality of further network entities, wherein the method comprises retrieving an identification together with a geographic coordinate from a database, and transmitting the retrieved identification together with the retrieved geographic coordinate towards a further network entity of the plurality of further network entities. Thus, an updating of a database associated to the further network entity can be realized efficiently.

In an eighth implementation form of the method according to the third aspect as such or any preceding implementation form of the third aspect, the communication network comprises a plurality of further network entities, wherein the method comprises receiving an identification together with a geographic coordinate from a further network entity of the plurality of further network entities, and storing the received identification together with the received geographic coordinate into a database. Thus, an updating of the database of the network entity by the further network entity can be realized efficiently.

In a ninth implementation form of the method according to the third aspect as such or any preceding implementation form of the third aspect, the method comprises communicating with a plurality of further network entities or a gateway entity of the communication network, and communicating with the number of mobile devices. Thus, a communication with the plurality of further network entities, the gateway entity, and the number of mobile devices can be performed efficiently.

According to a fourth aspect, the invention relates to a method for geographically routing a data packet towards a mobile device over a communication network, the data packet comprising an identification of the mobile device, the method comprising receiving the data packet, extracting the identification of the mobile device from the data packet, comparing the extracted identification of the mobile device with a number of identifications of a number of mobile devices, appending a geographic coordinate to the data packet associated with an identification if the extracted identification corresponds to the identification to obtain a modified data packet, and transmitting the modified data packet towards the mobile device based on the geographic coordinate appended to the data packet. Thus, an efficient concept for routing a data packet towards a mobile device over a communication network can be realized.

The method can be performed by the gateway entity. Further features of the method can directly result from the functionality of the gateway entity.

In a first implementation form of the method according to the fourth aspect as such, the method comprises storing the number of identifications of the number of mobile devices together with a number of geographic coordinates indicating geographic positions of the number of mobile devices, each identification being associated to a geographic coordinate. Thus, the number of identifications of the number of mobile devices together with the number of geographic coordinates can be provided efficiently.

In a second implementation form of the method according to the first implementation form of the fourth aspect, the communication network comprises a plurality of network entities, wherein the method comprises receiving an identification together with a geographic coordinate from a network entity of the plurality of network entities, and storing the received identification together with the received geographic coordinate into a database. Thus, an updating of the database associated to a gateway entity by the network entity can be realized efficiently.

In a third implementation form of the method according to the second implementation form of the fourth aspect, the method comprises transmitting a request signal towards the network entity of the plurality of network entities, receiving the identification together with the geographic coordinate from the network entity of the plurality of network entities upon transmission of the request signal, and storing the received identification together with the received geographic coordinate into the database upon transmission of the request signal. Thus, an updating of the database associated to a gateway entity can be triggered by the gateway entity.

In a fourth implementation form of the method according to the first implementation form to the third implementation form of the fourth aspect, the method comprises determining a number of future geographic coordinates indicating future geographic positions of the number of mobile devices upon the basis of the number of geographic coordinates, and storing the determined number of future geographic coordinates into a database, each identification being associated to a future geographic coordinate. Thus, future geographic coordinates can be considered for routing the data packet towards the mobile device.

In a fifth implementation form of the method according to the fourth implementation form of the fourth aspect, the method comprises comparing the extracted identification of the mobile device with the number of identifications, appending a future geographic coordinate associated with an identification to the data packet if the extracted identification corresponds to the identification to obtain a further modified data packet, and transmitting the further modified data packet additionally to the modified data packet towards the mobile device based on the future geographic coordinate appended to the data packet. Thus, a diversion of the data packet can be realized efficiently.

According to a fifth aspect, the invention relates to a computer program comprising a program code for performing the method according to the third aspect or the fourth aspect when executed on a computer. Thus, the methods can be performed in an automatic and repeatable manner.

The network entity and the gateway entity can be programmably arranged to perform the computer program. The network entity and the gateway entity can be implemented in hardware and/or software.

Further embodiments of the invention will be described with respect to the following figures, in which.

DETAILED DESCRIPTION OF EMBODIMENTS OF THE INVENTION

Figure 1:
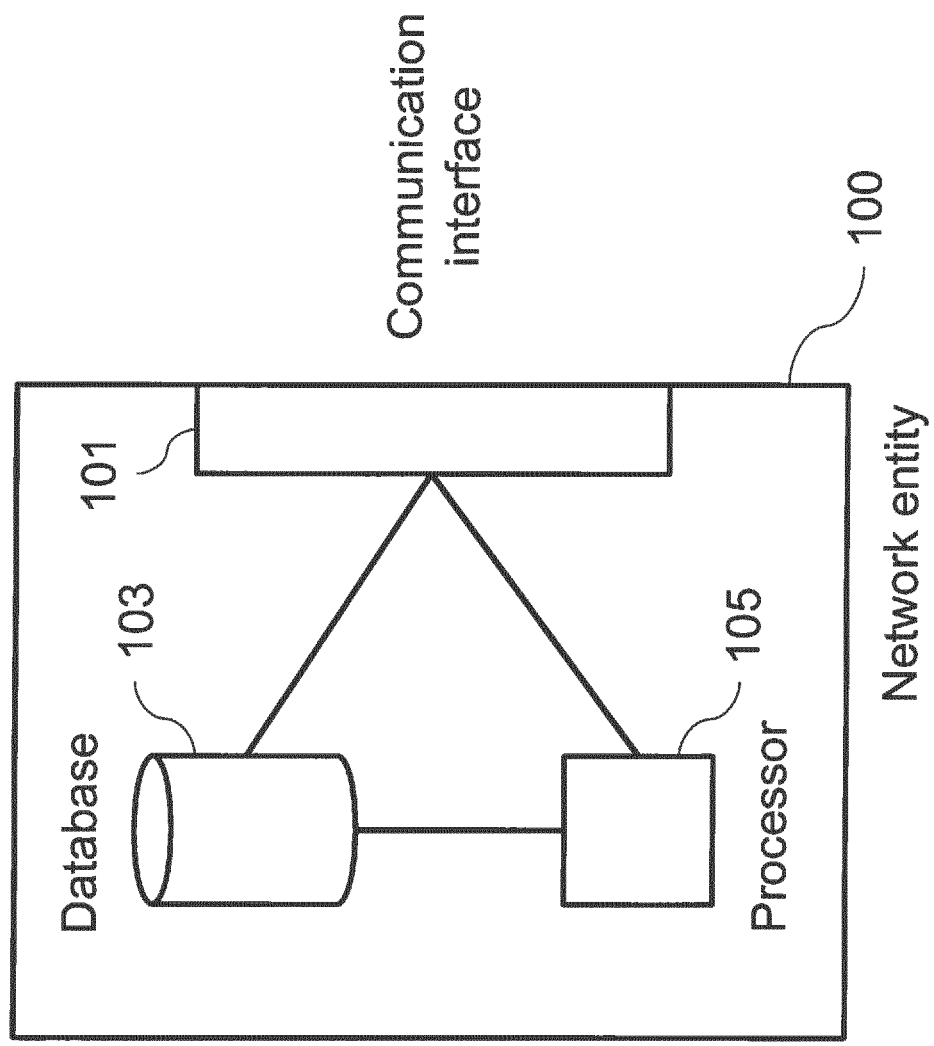
FIG. 1 shows a diagram of a network entity for geographically routing a data packet towards a mobile device over a communication network according to an embodiment.

FIG. 1 shows a diagram of a network entity 100 for geographically routing a data packet towards a mobile device over a communication network according to an embodiment. The data packet comprises an identification of the mobile device and a geographic coordinate indicating a geographic position of the mobile device.

The network entity 100 comprises a communication interface 101 being configured to receive the data packet over the communication network, and to extract the identification of the mobile device from the data packet, a database 103 being configured to store a number of identifications of a number of mobile devices together with a number of geographic coordinates indicating geographic positions of the number of mobile devices, each identification being associated to a geographic coordinate, and a processor 105 being configured to compare the extracted identification of the mobile device with the number of identifications, and to replace the geographic coordinate in the data packet by a geographic coordinate associated with an identification if the extracted identification corresponds to the identification to obtain a modified data packet, wherein the communication interface 101 is configured to transmit the modified data packet towards the mobile device.

In an embodiment, the communication interface 101 is configured to receive a number of beacon signals from a number of mobile devices, wherein the processor 105 is configured to determine a number of identifications of the number of mobile devices together with a number of geographic coordinates indicating geographic positions of the number of mobile devices upon the basis of the number of beacon signals, and wherein the processor 105 is configured to store the determined number of identifications together with the determined number of geographic coordinates into the database 103.

In a further embodiment, the communication network comprises a gateway entity, wherein the processor 105 is configured to retrieve an identification together with a geographic coordinate from the database 103, and wherein the communication interface 101 is configured to transmit the retrieved identification together with the retrieved geographic coordinate towards the gateway entity. In an embodiment, the communication network comprises another gateway entity, wherein the communication interface 101 is configured to transmit the retrieved identification together with the retrieved geographic coordinate towards the other gateway entity.

Figure 2:
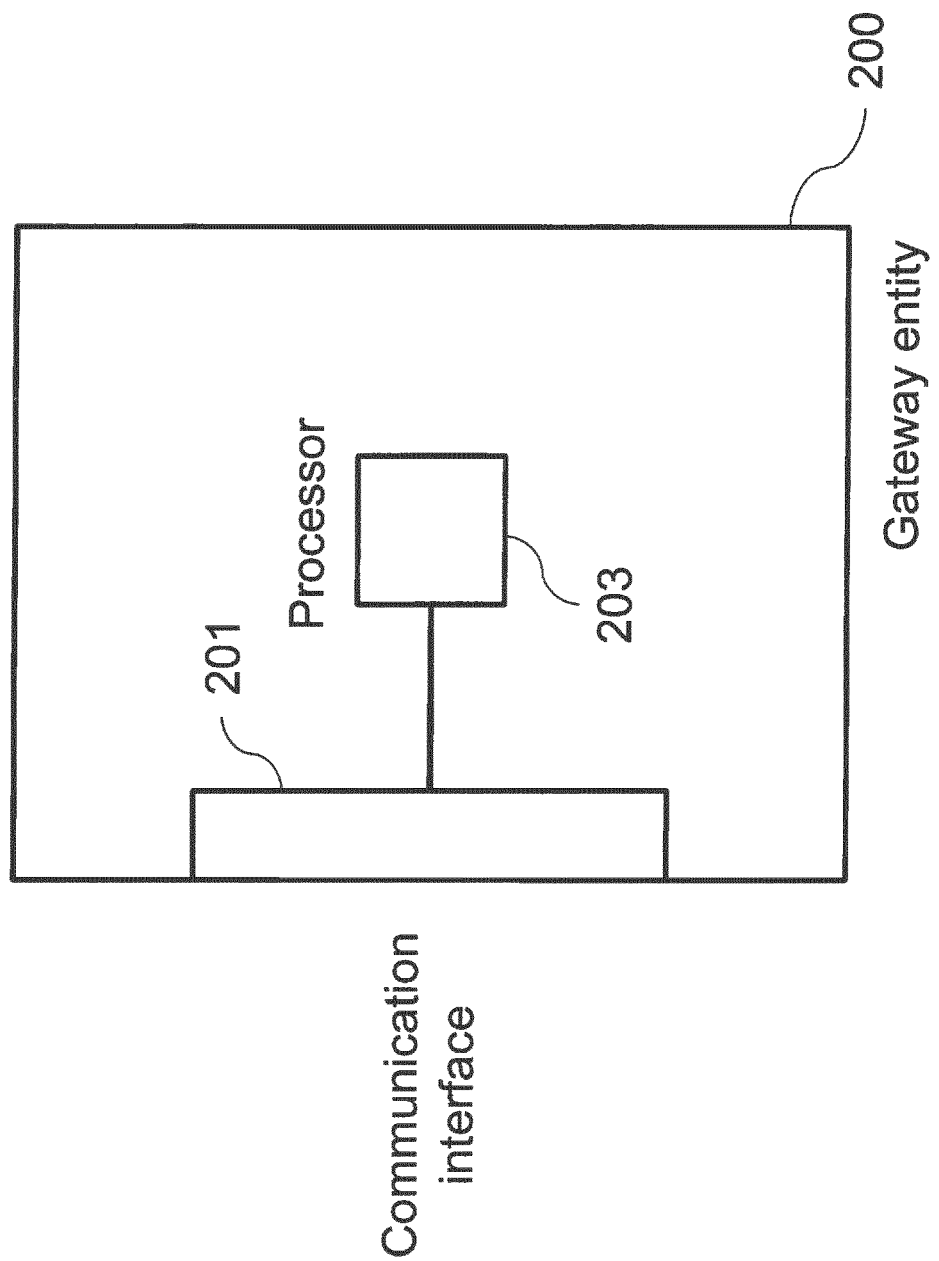
FIG. 2 shows a diagram of a gateway entity for geographically routing a data packet towards a mobile device over a communication network according to an embodiment.

FIG. 2 shows a diagram of a gateway entity 200 for geographically routing a data packet towards a mobile device over a communication network according to an embodiment. The data packet comprises an identification of the mobile device.

The gateway entity 200 comprises a communication interface 201 being configured to receive the data packet, and to extract the identification of the mobile device from the data packet, and a processor 203 being configured to compare the extracted identification of the mobile device with a number of identifications of a number of mobile devices, and to append a geographic coordinate to the data packet associated with an identification if the extracted identification corresponds to the identification to obtain a modified data packet, wherein the communication interface 201 is configured to transmit the modified data packet towards the mobile device based on the geographic coordinate appended to the data packet.

In an embodiment, the gateway entity 200 further comprises a database being configured to store the number of identifications of the number of mobile devices together with a number of geographic coordinates indicating geographic positions of the number of mobile devices, each identification being associated to a geographic coordinate.

In a further embodiment, the communication network comprises a plurality of network entities, wherein the communication interface 201 is configured to receive an identification together with a geographic coordinate from a network entity of the plurality of network entities, and wherein the processor 203 is configured to store the received identification together with the received geographic coordinate into the database.

Figure 3:
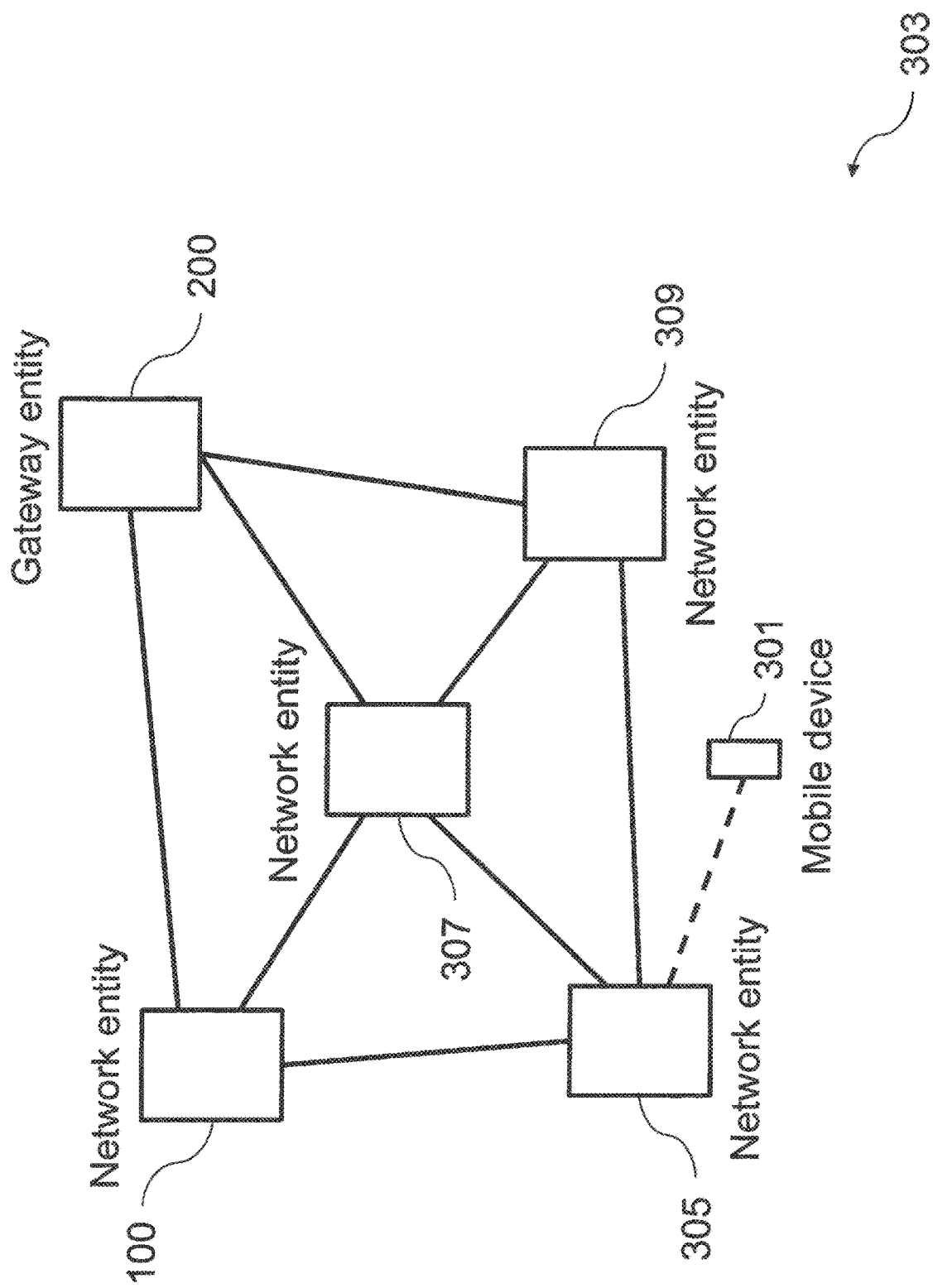
FIG. 3 shows a diagram of a communication network for geographically routing a data packet towards a mobile device according to an embodiment.

FIG. 3 shows a diagram of a communication network 303 for geographically routing a data packet towards a mobile device 301 according to an embodiment.

The communication network 303 comprises a network entity 100, a gateway entity 200, and a plurality of further network entities 305, 307, 309. The mobile device 301 is associated to the further network entity 305.

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

Figure 4:
FIG. 4 shows a diagram of a method for geographically routing a data packet towards a mobile device over a communication network according to an embodiment.

FIG. 4 shows a diagram of a method 400 for geographically routing a data packet towards a mobile device over a communication network according to an embodiment. The data packet comprises an identification of the mobile device and a geographic coordinate indicating a geographic position of the mobile device.

The method 400 comprises receiving 401 the data packet over the communication network, extracting 403 the identification of the mobile device from the data packet, storing 405 a number of identifications of a number of mobile devices together with a number of geographic coordinates indicating geographic positions of the number of mobile devices, each identification being associated to a geographic coordinate, comparing 407 the extracted identification of the mobile device with the number of identifications, replacing 409 the geographic coordinate in the data packet by a geographic coordinate associated with an identification if the extracted identification corresponds to the identification to obtain a modified data packet, and transmitting 411 the modified data packet towards the mobile device. The method 400 can be performed by the network entity 100.

Figure 5:
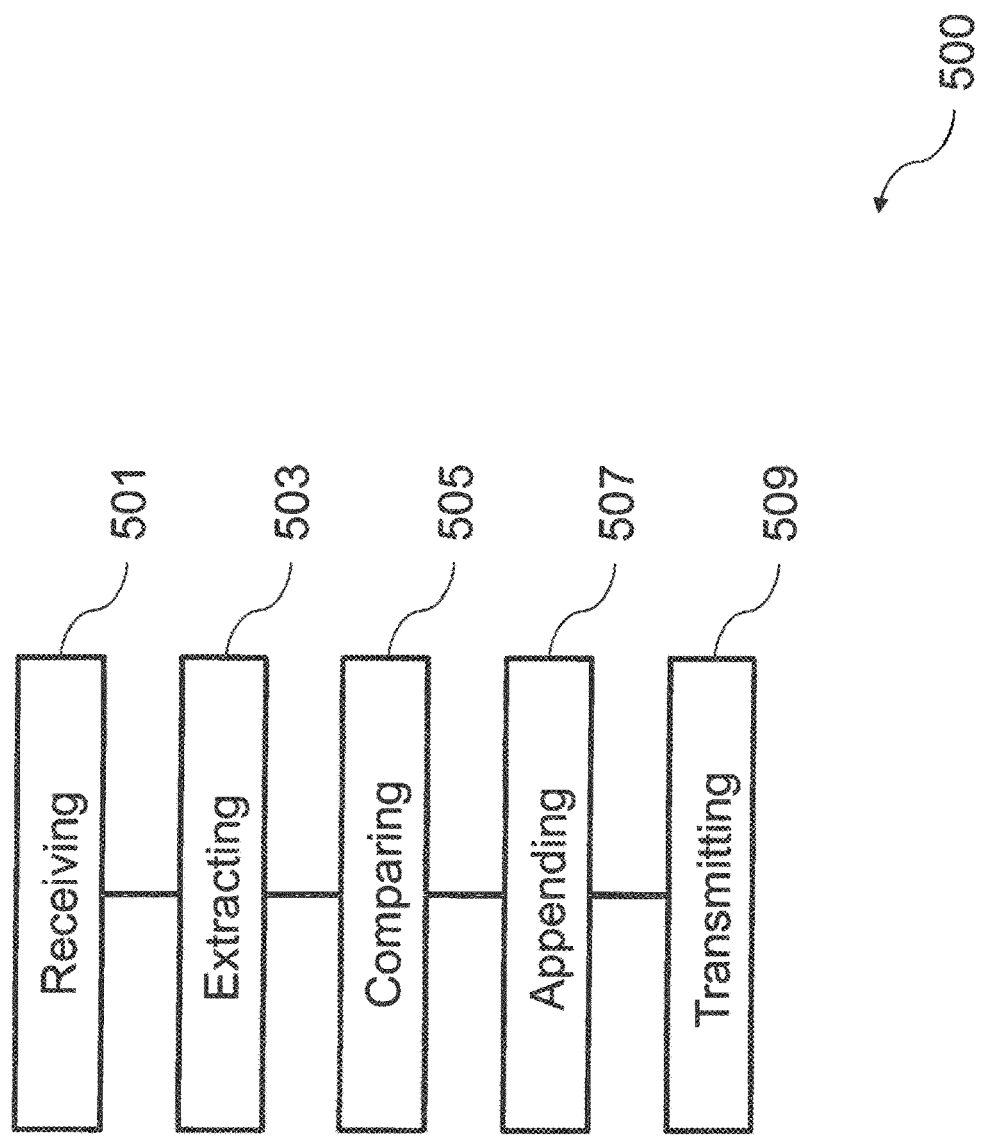
FIG. 5 shows a diagram of a method for geographically routing a data packet towards a mobile device over a communication network according to an embodiment.

FIG. 5 shows a diagram of a method 500 for geographically routing a data packet towards a mobile device over a communication network according to an embodiment. The data packet comprises an identification of the mobile device.

The method 500 comprises receiving 501 the data packet, extracting 503 the identification of the mobile device from the data packet, comparing 505 the extracted identification of the mobile device with a number of identifications of a number of mobile devices, appending 507 a geographic coordinate to the data packet associated with an identification if the extracted identification corresponds to the identification to obtain a modified data packet, and transmitting 509 the modified data packet towards the mobile device based on the geographic coordinate appended to the data packet.

Figure 6:
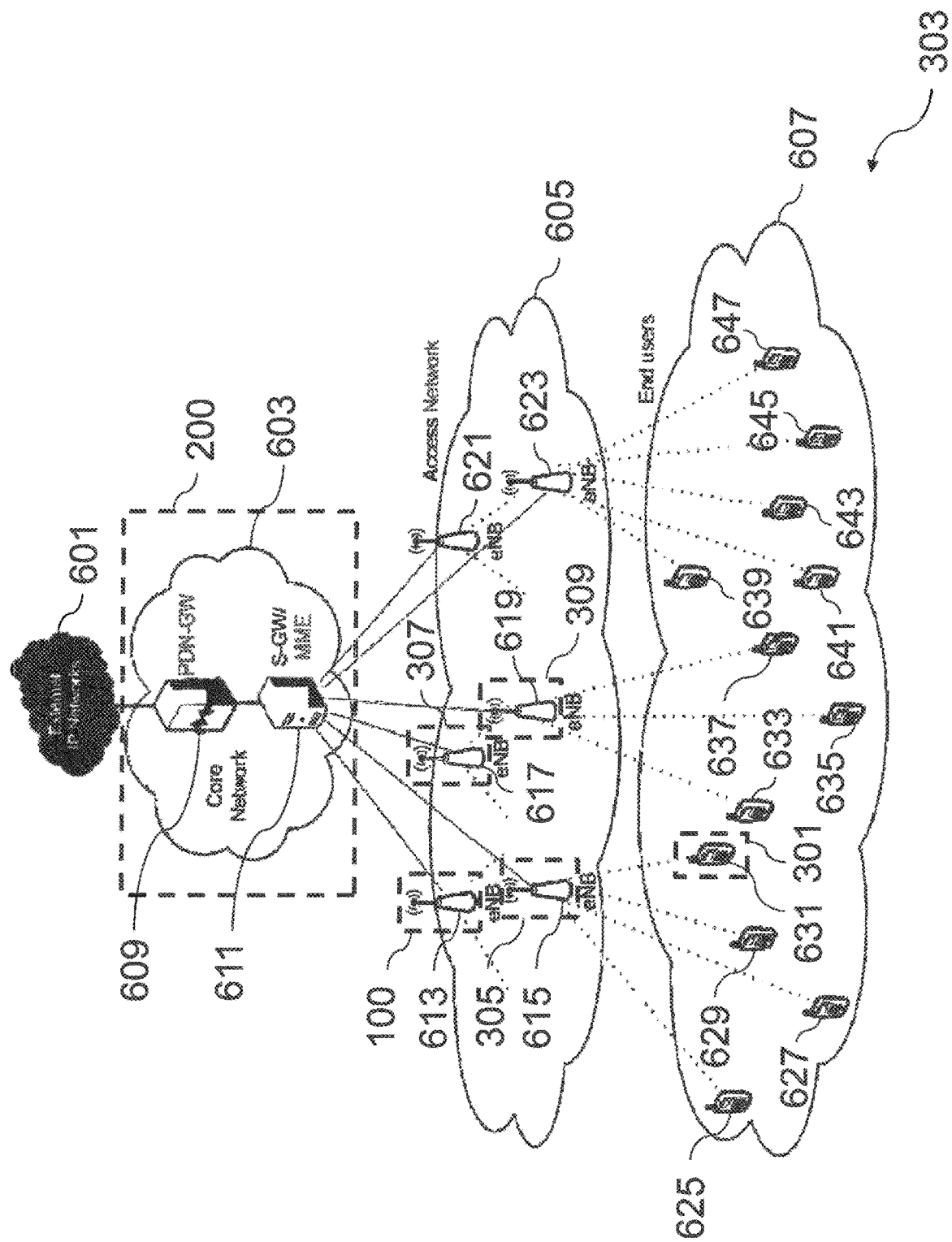
FIG. 6 shows a diagram of a communication network for routing a data packet towards a mobile device according to an embodiment.

FIG. 6 shows a diagram of a communication network 303 for routing a data packet towards a mobile device 301 according to an embodiment. The diagram illustrates a simplified architecture of a long term evolution (LTE)/evolved packet core (EPC) communication network.

The communication network 303 comprises an external IP network 601, a core network 603, an access network 605, and a mobile communication network 607. The core network 603 comprises a packet data network gateway 609 and a serving gateway/mobility management entity 611. The access network 605 comprises a plurality of evolved node B's (eNBs) 613-623. The mobile communication network 607 comprises a number of user equipments (UEs) 625-647.

The network entity 100 can comprise an evolved node B, e.g. the evolved node B 613. The further network entity 305 can comprise an evolved node B, e.g. the evolved node B 615. The further network entity 307 can comprise an evolved node B, e.g. the evolved node B 617. The further network entity 309 can comprise an evolved node B, e.g. the evolved node B 619. The gateway entity 200 can comprise the serving gateway e.g. in combination with a mobility management entity 611. The gateway entity 200 can further comprise the packet data network gateway 609. The serving gateway/mobility management entity 611 and the packet data network gateway 609 can be implemented in one physical equipment. The mobile device 301 can be a user equipment, e.g. the user equipment 631.

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

Current LTE/EPC communication networks can be designed as a hierarchical network where there are many-to-one relationships between network entities 100, 305, 307, 309, e.g. the evolved node B's (eNBs) 613-623, and a gateway entity 200, e.g. the serving gateway/mobility management entity (S-GW/MME) 611, and a one-to-one relationship between the gateway entity 200, e.g. the serving gateway/mobility management entity (S-GW/MME) 611 and a further gateway entity, e.g. the packet data network gateway (PDN-GW) 609, towards the external IP network 601.

The mobility management for the communication network 303, in particular for the access network 605 and the core network 603, can be defined in technical specifications, e.g. of the 3$^{rd}$ generation partnership project (3GPP) standardization body. In particular, the mobility management functionality can be responsible to ensure that the communication network 303 can reach the mobile device 301, for instance, to notify the mobile device 301 about incoming data packets or calls. The total area covered by a wireless mobile communication network, in particular by the access network 605, can be subdivided into tracking or location areas, e.g. according to 2$^{nd}$ generation (2G)/3$^{rd}$ generation (3G) terminology. Each one of those areas can comprise a number of network entities 100, 305, 307, 309 that can provide a continuous physical coverage.

When there is no application or user data to send or to receive, the mobile device 301 can be in idle mode most of the time to save energy. In that mode, the radio circuits, e.g. the transceivers, of the mobile device 301 can be in an energy saving or dormant state and they may wake up only to receive a paging message.

Paging can be used for the purpose of searching for an idle mobile device 301 and of establishing a signaling connection link. The paging message can be broadcasted periodically on a common paging channel. It can comprise a number of the tracking area and the identifications of the mobile devices, e.g. the mobile device 301, which are, or may be, in that tracking area and for which there is an incoming traffic.

The mobile device 301 in idle mode may respond to the paging message in different ways. Firstly, if the identification of the mobile device 301 is present in the paging message, there can be an incoming data packet or traffic. Then, the mobile device 301 can initiate a procedure to support data connectivity with the communication network 303 in order to receive the incoming data packet or traffic. Secondly, if the mobile device 301 notices that its traffic area has changed, e.g. by comparing the tracking area field in the penultimate paging message to the tracking area field in the latest paging message, it can send a location update message to the communication network 303.

The paging procedure can be triggered, for instance, by downlink data packets arriving at the gateway entity 200, e.g. the serving gateway (S-GW), from a further gateway entity, e.g. the packet data network gateway (PDN-GW) 609. When the gateway entity 200, e.g. the serving gateway (S-GW), receives a downlink data packet destined for an idle mobile device 301, it may not have a network entity address, e.g. an eNB address, to which it can send the data packet. The gateway entity 200, e.g. the serving gateway (S-GW), can instead inform the mobility management entity (MME) that a downlink data packet has arrived, e.g. using a downlink data notification message. The mobility management entity (MME), among other functions to control signaling related to mobility and security, can manage all mobile devices that are in idle mode, including support for tracking area (TA) management and paging. It can know in which tracking area (TA) the mobile device 301 is and it can send a paging request to all network entities 100, 305, 307, 309, e.g. the evolved node B's 613-623, within the tracking area (TA) lists. Upon reception of the paging message, the mobile device 301 can respond to the mobility management entity (MME) and the mobility management entity (MME) can inform the serving gateway (S-GW) so that the downlink data packet may be forwarded to the network entity 305, e.g. the evolved node B 615, which the mobile device 301 is attached to. In other words, to the network entity 305 currently serving the mobile device 301.

A massive deployment of network entities 100, 305, 307, 309, e.g. small low power access nodes, can be a promising solution to cope with mobile traffic increase, in particular in dense urban environments. They can be deployed both with and without macro coverage. Moreover, automatic mechanisms, such as plug-and-play provisioning to support flexible configuration and lower cost for operation and maintenance, can be considered for both operator- and user-deployed scenarios, taking into account a possible absence of radio planning on these deployments.

Future architectures can be characterized by an increased densification of outdoor deployment of network entities 100, 305, 307, 309, e.g. access nodes, with an inter-entity distance of 50-150 meters or even 20-50 meters in a streetlamp deployment scenario. This can mean that network entities 100, 305, 307, 309, e.g. small access nodes, can be on the order of tens or hundreds of times more densely distributed than macro network entities or macro base stations. It is widely accepted that these network entities 100, 305, 307, 309, e.g. small access nodes, can connect to the core network 603 through a wireless and/or wired mesh backhaul network in comparison with traditional architectures wherein each network entity 100, 305, 307, 309, e.g. evolved node B 613-623, has a one-to-one relationship to the gateway entity 200, e.g. the serving gateway/mobility management entity (S-GW/MME) 611, of the core network 603.

Making a radio access network (RAN) comprising massively deployed network entities 100, 305, 307, 309, e.g. access nodes, and a large-scale mesh backhaul network operationally efficient can be a challenging task since current location management principles may not be applied straightforwardly in these circumstances. Taking into account ×100 times more densely distributed network entities 100, 305, 307, 309, e.g. access nodes, it can lead to a large signaling overhead throughout the communication network 303 related to broadcast paging or tracking area (TA) update registration messages. The former can happen if tracking areas (TAs) account for a large number of cells, thus increasing paging cost and delay in order to track-down the mobile device 301. On the contrary, if tracking areas (TAs) are made smaller accounting for a smaller number of cells, mobile devices are more likely to change the tracking areas (TAs), thus increasing tracking area (TA) update signaling. Moreover, a possibility to make paging optional for mobile devices can be considered as a desirable feature in future radio access networks to reduce the energy consumption of the mobile device 301. As a result, a new approach for location management can be desired.

Figure 7:
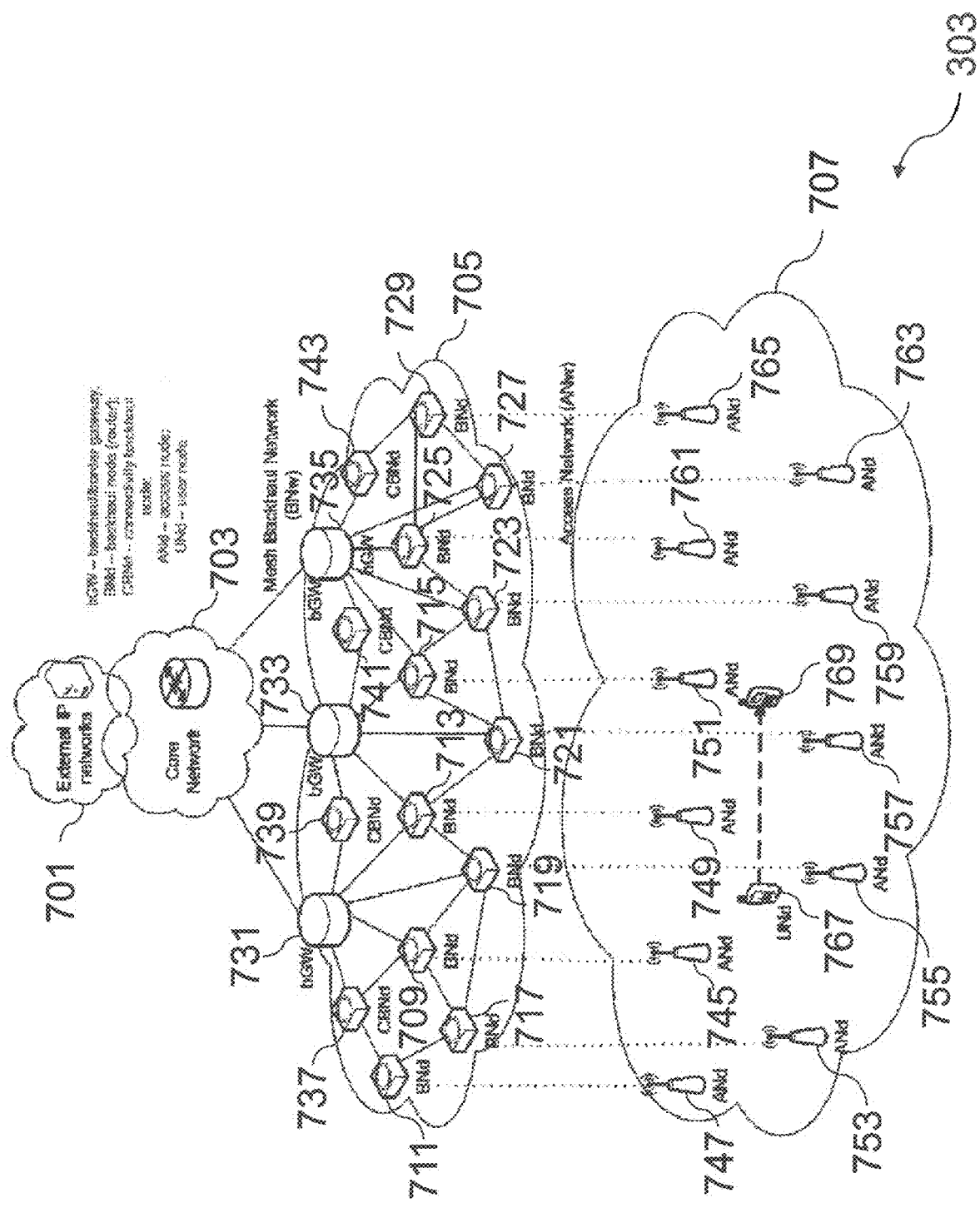
FIG. 7 shows a diagram of a communication network for geographically routing a data packet towards a mobile device according to an embodiment.

FIG. 7 shows a diagram of a communication network 303 for geographically routing a data packet towards a mobile device 301 according to an embodiment. The diagram illustrates a reference architecture of the communication network 303. The described mobility management mechanism can be applied within the reference architecture.

The communication network 303 comprises an external IP network 701, a core network 703, a mesh backhaul network (BNw) 705, and an access network (ANw) 707. The mesh backhaul network 705 comprises a plurality of backhaul nodes (BNds) 709-729, a plurality of backhaul border gateways (bGWs) 731-735, and a plurality of connectivity backhaul nodes (CBNds) 737-743. The access network 707 comprises a plurality of access nodes (ANds) 745-765. A user node (UNd) 767-769 is attached to the access network 707. It is to be pointed out that FIG. 7 shows one user node indicated by the reference signs 767 and 769 at a first location (reference sign 767) and a second location (reference sign 769).

The backhaul node 709 and the access node 745 can e.g. be comprised by the network entity 100. The backhaul node 711 and the access node 747 can e.g. be comprised by the further network entity 305. The backhaul node 713 and the access node 749 can e.g. be comprised by the further network entity 307. The backhaul node 715 and the access node 751 can e.g. be comprised by the further network entity 309. The plurality of backhaul border gateways 731-735 can e.g. be comprised by the gateway entity 200.

The user node 767-769 can e.g. be comprised by the mobile device 301. In the diagram, the mobile device 301 moves and as a result its geographic position is changing. The user node 767-769 refers to one mobile device 301 moving from one geographic position (reference sign 767) to another geographic position (reference sign 769).

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

The approach covers location or position management aspects. An objective is to provide an efficient data packet delivery for radio access networks (RAN) comprising densely deployed network entities 100, 305, 307, 309, e.g. outdoor access nodes 745-765, and a large-scale mesh backhaul network 705. Current and predicted position information of the mobile device 301 can be used for data packet delivery through the core network 703, the mesh backhaul network 705, and the access network 707, without a paging procedure. The approach can be based on the use of a location management mechanism that can provide up-to-date position information for an underlying routing protocol that can use the geographic position information for an appropriate data packet routing and/or forwarding towards the geographic position of the mobile device 301. This can allow reducing the energy consumption of the mobile device 301 avoiding paging in this dense environment. Besides, the location management mechanism can enable minimizing a signaling overhead throughout the communication network 303 and a delay or latency throughout the communication network 303.

The approach can realize a mobility or location management mechanism for an efficient data packet delivery to the mobile device 301 in a dense outdoor radio access network. In contrast to different approaches, the communication network 303 may not employ a paging procedure. The mechanism comprises a position update and position look-up procedure related to current and predicted geographical positions of mobile devices in the communication network 303.

When there are new data packets in the communication network 303, in particular in the core network 703, that are addressed to a mobile device 301, e.g. the user node 767, in idle mode and it is not known where the mobile device 301, e.g. the user node 767, is, for example, because the mobile device 301 has moved, the communication network 303 may not flood the network entities 100, 305, 307, 309, e.g. access nodes 745-765, with paging messages. Instead, the network entity 100, 305, 307, 309 that has received those data packets can redirect them to the last known position of the mobile device 301, e.g. the user node 767. The network entities 100, 305, 307, 309, e.g. access nodes 745-765, around that position can store for some time information about previously encountered mobile devices, e.g. in the database 103 described in conjunction with FIG. 1. This information can be sufficient to infer the direction in which the mobile device 301 has moved. Therefore, data packets approaching the destination can be forwarded to the next hops on the trail of the moving mobile device 301 to reach it.

Since the communication network 303 can approximately know the position of the mobile device 301, e.g. the user node 767, and the direction in which the mobile device 301, e.g. the user node 767, moves, it can predict future positions of the mobile device 301. A future position of the mobile device 301 is indicated by the user node 769. In order to increase system robustness, data packets arriving to the communication network 303 can be duplicated to be sent also towards predicted positions to meet the moving mobile device 301 from the front, e.g. by the communication interface 101 described in conjunction with FIG. 1.

A basic operation of the approach can be implemented by means of a local cluster that network entities that are near to the mobile device form around that mobile device, e.g. based on uplink beacon signals from the mobile device. The local cluster can e.g. comprise the access nodes 755, 745, 749 and associated backhaul nodes 719, 709, 713. When the mobile device, e.g. user node 767, moves, these nodes can change. When the mobile device moves, the local cluster can move together with the mobile device, i.e. the network entities, e.g. comprising access nodes, inside the local cluster can change.

Figure 12:
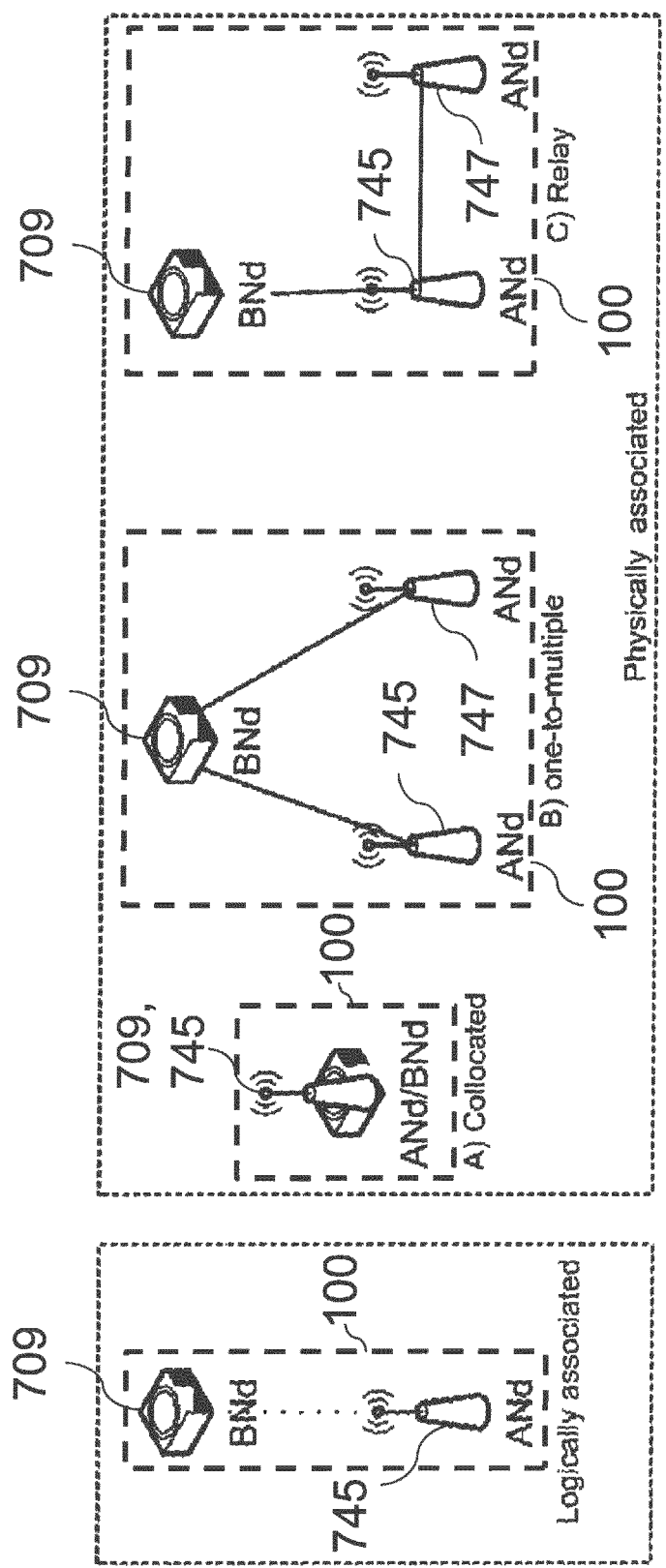
FIG. 12 shows diagrams of a network entity comprising an access node and a backhaul node according to embodiments.

The diagram depicts the access network 707 comprising the plurality of access nodes 745-765 and the large scale mesh backhaul network 705. The mesh backhaul network 705 comprises backhaul nodes or mesh routers, and backhaul gateways. Two types of backhaul nodes can be considered. The first type comprises backhaul nodes (BNd) 709-729 associated with corresponding access nodes 745-765, and the second type comprises backhaul nodes used mainly for connectivity purposes, which are connectivity backhaul nodes (CBNd) 737-743. A logical association between access nodes 745-765 and backhaul nodes 709-729 is shown in FIG. 12.

Each network entity 100, 305, 307, 309, e.g. backhaul node 709-729, can know its position, e.g. its geographical position in terms of a geographic (x,y) coordinate. There can be a coordinate space that can allow assigning positions to backhaul node identifications, e.g. by using a global positioning system (GPS), by means of virtual coordinate spaces, or further techniques. In order to save energy, the mobile device 301 can enter an idle mode relieving the mobile device 301 from signaling throughout the communication network 303 on its whereabouts. A paging procedure can be optional.

Embodiments can be based on the concept of a local cluster in order to support mobility or location management and an efficient data packet delivery in radio access networks (RAN) comprising densely deployed network entities 100, 305, 307, 309, e.g. access nodes 745-765, and a wired and/or wireless mesh backhaul network 705. The local cluster (LoCluster) can indicate a geographic and/or radio neighborhood around the mobile device 301 formed by a subset of network entities, e.g. access nodes, within a beacon service range of the mobile device 301, and the network entities 100, 305, 307, 309, e.g. the associated backhaul nodes 709-729, can handle position tables for the mobile device 301 and can have routing and/or forwarding capabilities.

When the mobile device 301 moves, its local cluster can move together with it, i.e. network entities 100, 305, 307, 309, e.g. access nodes 745-765 and associated backhaul nodes 709-729, in this deployment scenario, inside of the neighborhood of the mobile device 301 can change. The local cluster can allow supporting an efficient data packet delivery by diverting data packets by means of network entities, e.g. backhaul nodes 709-729, to an appropriate position as they approach the destination.

The concept of the local cluster (LoCluster) moving together with a mobile device 301 can also be applied to other communication network deployment scenarios for mobility management purposes. For instance, the local cluster (LoCluster) may comprise only access nodes, e.g. in mobile communication networks, or access nodes and associated virtual network elements in a remote data center, so called cloud radio access network (cloud RAN).

Embodiments can be based on the use of a position-based, e.g. geographic, routing protocol to deliver data packets through a large-scale mesh backhaul network 705 in mobile communication networks.

Position-based routing protocols can be used in large-scale wireless mesh networks and ad-hoc networks in order to improve scalability of large-scale networks in comparison with topological routing protocols. Besides, related to mobility issues, and at an architectural level, a common belief in the research community is that, unlike in an Internet protocol (IP) context, identifications and/or addresses, e.g. a current geographic coordinate in the communication network 303 of mobile devices, should not be integrated into a single identification. The main purpose of this is to enable designing efficient mobility management schemes. This can fit well in the concept of position-based routing that can comprise two building blocks, namely a position-based routing and/or forwarding itself and a location management and/or service that can provide the position information.

The geographic coordinates, e.g. in terms of geographic coordinate systems, can be included in the data packet header of the data packet and a position-based routing can route and/or forward the modified data packet towards the destination. Positioning can be a default feature in future communication networks to provide a coordinate space for all entities involved in the communication, including mobile devices. From this viewpoint, it may also be practical to use position-based routing protocols as an application for this communication network feature.

There can be different geographic coordinate systems specifying a geographical position by a set of numbers or letters that can represent latitude, longitude and elevation. Different coordinate formats can be used in the geographic coordinate systems, for instance, degrees, minutes seconds: 60° 10' 15" N, 24° 56' 15" E, decimal degrees: 60.170833, 24.9375, or a Geo URI scheme: 60.170833,24.9375, e.g. defined by the Internet Engineering Task Force in RFC 5870. A conversion among formats can be performed if it is desired to use the formats across space and over time.

Embodiments can be based on a geographic coordinate used in a protocol data packet header and obtained by means of mapping within a position database between an identification of the mobile device 301, e.g. a mobile device identification (ID), its current geographic position in the communication network 303, e.g. using a current position address (CPA), and its predicted geographic position, e.g. using a predicted position address (PPA), if the communication network 303 supports a predicted mobility mechanism.

Embodiments can be based on position updates which can be sent to a remote position database located in a gateway entity 200, e.g. a serving gateway 611 or a backhaul gateway 731, 733, 735, and to local position databases located in network entities, e.g. the database 103 described in conjunction with FIG. 1, belonging to the local cluster of the mobile device 301. Thresholds and triggers to send position updates to remote and local databases can be different in order to save in signaling.

Embodiments can be based on a position update which can comprise a mobile device identification (ID), a current geographic position of the mobile device 301, a time stamp for the current geographic position, a predicted geographic position of the mobile device 301, a timestamp for the predicted geographic position, a radio link quality measure, and further parameters. The current and predicted geographic positions of the mobile device 301 can be estimated at the network level based on beacon signals received from the mobile device 301, and/or a radio environment map. The beacon signal can e.g. be received by the communication interface 101 described in conjunction with FIG. 1.

Embodiments can be based on a position update to a remote position database of the gateway entity 200 which can be sent by a primary network entity 100, 305, 307, 309, e.g. a primary access node 745, 749 or 755, of a local cluster (LoCluster). The primary network entity 100, 305, 307, 309 can be selected by the network side, for instance, based on analysis of radio quality (RQ) measures of uplink beacon signals transmitted by the mobile device 301 and received by network entities 100, 305, 307, 309, e.g. access nodes 745-765, within the local cluster (LoCluster). The beacon signal can e.g. be received by the communication interface 101 described in conjunction with FIG. 1.

Embodiments can be based on a data packet delivery in parallel to current and predicted geographic positions of the mobile device 301 to ensure a successful data packet delivery. Location service concept principles in wireless mesh networks can be applied, extended and adapted to the specifications of future communication networks.

In the following, functional entities and components are described in more detail. A local cluster (LoCluster) of a mobile device 301 can be a subset of network entities 100, 305, 307, 309, e.g. access nodes 745-765 and associated backhaul nodes 709-729, forming a geographic and/or radio neighborhood in terms of a cluster around a mobile device 301 of an end-user. Thus, each mobile device 301 can have its own local cluster (LoCluster).

As an example, the formation of a local cluster (LoCluster) around a mobile device 301 can be determined upon the basis of radio conditions. For a mobile device 301 network entities 100, 305, 307, 309, e.g. access nodes 745-765 which provide downlink reference signals with sufficient signal strength, or other criteria, can constitute a local cluster (LoCluster) for this mobile device 301. As another example, a set of network entities 100, 305, 307, 309, e.g. access nodes 745-765, receiving an uplink reference signal or a beacon signal with sufficient quality may constitute a feasible local cluster (LoCluster) for this mobile device 301.

All network entities 100, 305, 307, 309, e.g. backhaul nodes 709-729 associated with access nodes 745-765, inside a local cluster (LoCluster) can have an entry in their local position database or position server, e.g. in the database 103 described in conjunction with FIG. 1, for the mobile device 301. They can also disseminate position information and local information updates to further network entities 100, 305, 307, 309, e.g. comprising further local position databases or position servers, inside the neighborhood. If a mobile device 301 moves, its local cluster (LoCluster) can move together with it, that is, network entities 100, 305, 307, 309, e.g. access nodes 745-765 and backhaul nodes 709-729, inside the neighborhood of the mobile device 301 change.

Each mobile device 301 can have a mobile device identification (ID) that may not be changed when the mobile device 301 moves in the access network 707, i.e. forming a permanent identification or identifier in this sense. A temporary geographic position of a mobile device 301 can be defined by a current position address (CPA). A future predicted geographic position of a mobile device 301 can be defined by a predicted position address (PPA).

A local position database, e.g. the database 103 described in conjunction with FIG. 1, can comprise a position table comprising entries. That is, the network entities 100, 305, 307, 309, e.g. backhaul nodes 709-729, inside the local cluster (LoCluster) of the mobile device 301 can be considered as to comprise local position databases or position servers, e.g. a database 103 described in conjunction with FIG. 1, comprising the corresponding position tables. The fields stored in each entry of the position table can comprise a mobile device identification (ID), a current geographic position of the mobile device 301, e.g. an ID-CPA pair, and a timestamp related to the position update. Besides, a radio link quality measure can be included in the fields, e.g. for remote position update purposes. It can be assumed that routing allows reaching the position databases or position servers inside a local cluster.

A remote position database can be located in a gateway entity 200. Depending on implementation options, network deployment scenarios, and a connectivity mode, e.g. a connection-oriented or a connectionless connectivity mode, the remote position database can be located, for instance, in a serving gateway (S-GW) or in backhaul border gateways 731-735. The remote position database can be updated less frequently than the local position databases in order to minimize signaling overhead throughout the communication network 303, i.e. different schemes can be used for triggering updates.

The fields stored in each entry of the remote position database can comprise a mobile device identification (ID), a current geographic position of the mobile device 301, and a predicted geographic position of the mobile device 301 if a predicted position mechanism is supported by the communication network 303 when the mobile device 301 moves, timestamps for current and predicted geographic positions, and an identification and position of local databases or local database servers, e.g. in backhaul nodes 709-729, inside the local cluster (LoCluster), through which the position update was sent. Optionally, a validity time informing how long a mobile device 301 is going to be in an active or receiving state can be used, e.g. to remove stale entries from the database and to avoid forwarding those data packets to the mobile device 301 if it is not active anymore.

Figure 8:
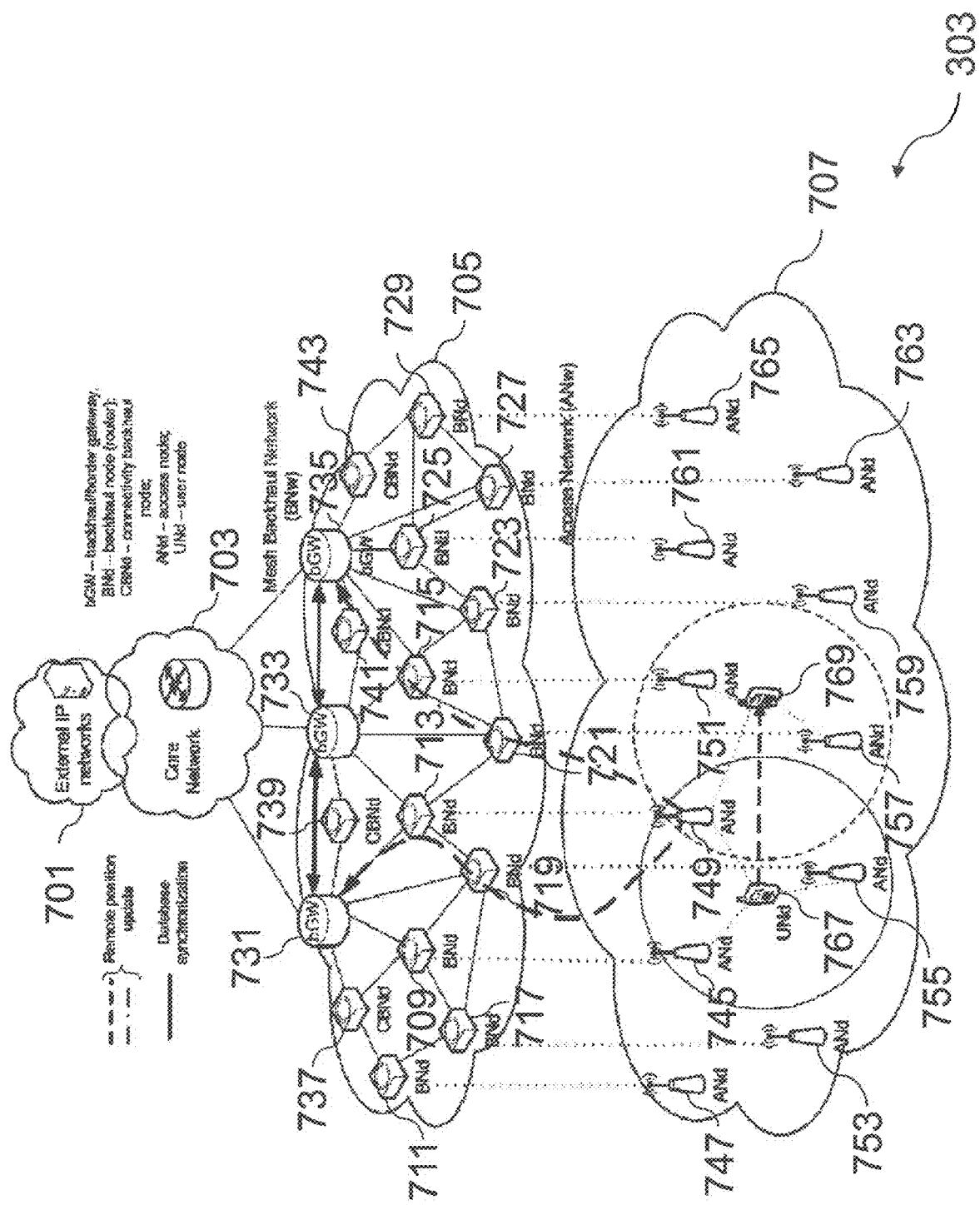
FIG. 8 shows a diagram of updating a database associated to a gateway entity of a communication network according to an embodiment.

FIG. 8 shows a diagram of updating a database associated to a gateway entity 200 of a communication network 303 according to an embodiment. The diagram illustrates a position update procedure of a remote position database located in the gateway entity 200, e.g. a backhaul gateway, when a user node (767, 769) moves and its local cluster changes.

The communication network 303 comprises an external IP network 701, a core network 703, a mesh backhaul network (BNw) 705, and an access network (ANw) 707. The mesh backhaul network 705 comprises a plurality of backhaul nodes (BNds) 709-729, a plurality of backhaul border gateways (bGWs) 731-735, and a plurality of connectivity backhaul nodes (CBNds) 737-743. The access network 707 comprises a plurality of access nodes (ANds) 745-765. A user node (UNd) 767-769 is attached to the access network 707.

The backhaul node 709 and the access node 745 can e.g. be comprised by the network entity 100. The backhaul node 711 and the access node 747 can e.g. be comprised by the further network entity 305. The backhaul node 713 and the access node 749 can e.g. be comprised by the further network entity 307. The backhaul node 715 and the access node 751 can e.g. be comprised by the further network entity 309.

The plurality of backhaul border gateways 731-735 can e.g. be comprised by the gateway entity 200. The user node 767-769 can e.g. be comprised by the mobile device 301. The corresponding local clusters of the mobile device 301 at two geographic positions are indicated by circles in FIG. 8. In this example it is assumed that the mobile device moves from a first position (767) having the local cluster formed by access nodes 745, 749, 755 to a second position (769) having the local cluster formed by access nodes 749, 751, 757.

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

In the following, the position update procedure of the remote position database is described in more detail. Position updates of mobile device positions towards the remote position database associated to the gateway entity 200 can e.g. be initiated in the following cases. Firstly, if a mobile device 301 is turned on. Secondly, if a mobile device 301 is moving. Thirdly, if a mobile device 301 does not move, but a soft-state refreshing is desired.

Position updates can be triggered depending on a chosen scheme. In fact, there can be a number of schemes that can be used for initiation of position updates, for instance, distance-based, timer-based, movement-based, and/or speed-based schemes. As an example, in a case of a movement-based scheme, radio quality (RQ) measures associated to mobile device entries for different timestamps in the local databases of a local cluster (LoCluster), e.g. a database 103 described in conjunction with FIG. 1, can be analyzed, e.g. at the communication network side. If successive radio quality (RQ) measurements denote monotonous changes, e.g. strictly increasing or decreasing, it may give an indication that a mobile device 301 is moving towards or is moving away from this specific area and the remote position database should be updated. Then, the communication network 303, e.g. comprising the gateway entity 200 or a control entity, can select a primary network entity 100, 305, 307, 309, e.g. a primary access node 745-765, in the local cluster (LoCluster), e.g. having maximum signal strength, to initiate the position update to the remote position database in the gateway entity 200, e.g. a serving gateway or a backhaul gateway, through corresponding further network entities 100, 305, 307, 309, e.g. backhaul nodes 709-729.

The remote position update can comprise information about the current geographic position of the mobile device 301 and a predicted position of the mobile device 301 if the communication network 303 supports a mechanism to predict a destination of the mobile device 301. For instance, current and predicted geographic positions can be estimated using beacon signals received from the mobile device 301, e.g. by the communication interface 101 described in conjunction with FIG. 1, and/or a radio environment map. As an option, prediction mechanisms can also be based on radio quality (RQ) measures received from the different network entities 100, 305, 307, 309, e.g. access nodes 745-765, of the local cluster (LoCluster) indicating at which pace and direction the mobile device 301 moves.

In case it is desired to increase robustness, the update message initiated by a primary network entity 100, 305, 307, 309, e.g. a primary access node 745-765, can be split by the primary network entity 100, 305, 307, 309, e.g. an associated backhaul node 709-729, in two or more paths in parallel towards a remote position database as depicted as dashed and dash-dotted lines in FIG. 8, though it may lead to an additional signaling overhead.

FIG. 8 illustrates a position update procedure where the remote database associated to the gateway entity 200 is replicated in different entities, e.g. the backhaul border gateways 731-735, for an improved reliability. As an option, a coordination and/or synchronization between the different entities, e.g. the backhaul border gateways 731-735, can be arranged as depicted by the solid line in the figure to have the same up-to-date entries in corresponding position tables.

In the following, a position update of a local position database, e.g. the database 103 described in conjunction with FIG. 1, is described in more detail. The procedure of updating or refreshing of position information of local position tables of network entities 100, 305, 307, 309, e.g. access nodes 745-765 and corresponding backhaul nodes 709-729, inside the local cluster (LoCluster), can be different from that of remote position tables located in the gateway entity 200, e.g. the backhaul border gateways 731-735 or a serving gateway. Inside the local cluster (LoCluster), the mobile device 301 can broadcast uplink beacon signals to the network entities 100, 305, 307, 309, e.g. access nodes 745-765, inside the neighborhood or beacon service range as illustrated in the bottom part of the figure. The beacon signals can e.g. be received by the communication interface 101 described in conjunction with FIG. 1. A mobile device position can be estimated at the communication network level, for instance, using information on received beacon signals and/or a radio environment map. As a result, the network entities 100, 305, 307, 309, e.g. associated backhaul nodes 709-729, in the local cluster (LoCluster) can update their local position tables in the corresponding local position databases, e.g. a database 103 described in conjunction with FIG. 1.

In order to limit the position update overhead throughout the communication network 303, the position update procedure can be localized. That is, network entities 100, 305, 307, 309 inside the local cluster (LoCluster) can be updated more frequently with regard to their local position databases, e.g. a database 103 described in conjunction with FIG. 1, than remote position databases or position servers associated to the gateway entity 200, e.g. backhaul border gateways 731-735 or a serving gateway. In other words, different thresholds can be used for triggering updates to the local and remote position databases. If a mobile device 301 does not move, the refreshing procedure of the local cluster (LoCluster) can periodically be carried out using beacon signals in order to inform the communication network 303 that the mobile device 301 is not switched off and may be reachable. The local cluster (LoCluster) of a mobile device 301 can be refreshed more often than the remote position database associated to the gateway entity 200.

Figure 9:
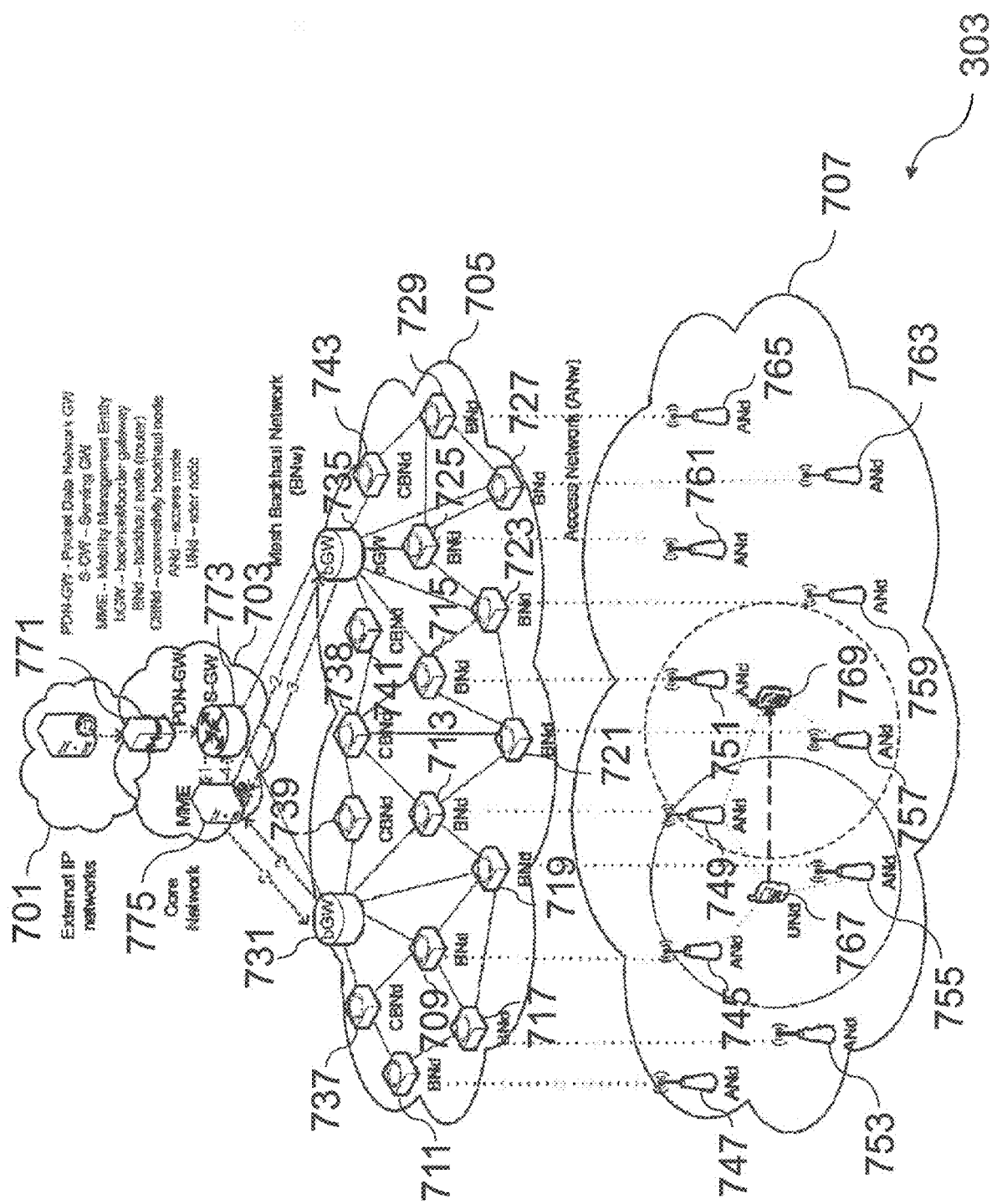
FIG. 9 shows a diagram of providing a data packet by a gateway entity of a communication network according to an embodiment.

FIG. 9 shows a diagram of providing a data packet by a gateway entity 200 of a communication network 303 according to an embodiment. The diagram depicts a look up procedure.

The communication network 303 comprises an external IP network 701, a core network 703, a mesh backhaul network (BNw) 705, and an access network (ANw) 707. The core network 703 comprises a packet data network gateway 771, a serving gateway 773, and a mobility management entity 775. The mesh backhaul network 705 comprises a plurality of backhaul nodes (BNds) 709-729, a plurality of backhaul border gateways (bGWs) 731-735, and a plurality of connectivity backhaul nodes (CBNds) 737-743. The access network 707 comprises a plurality of access nodes (ANds) 745-765. A user node (UNd) 767-769 is attached to the access network 707.

The backhaul node 709 and the access node 745 can e.g. be comprised by the network entity 100. The backhaul node 711 and the access node 747 can e.g. be comprised by the further network entity 305. The backhaul node 713 and the access node 749 can e.g. be comprised by the further network entity 307. The backhaul node 715 and the access node 751 can e.g. be comprised by the further network entity 309.

The plurality of backhaul border gateways 731-735, the packet data network gateway 771, the serving gateway 773, and the mobility management entity 775 can e.g. be comprised by the gateway entity 200. The user node 767-769 can e.g. be comprised by the mobile device 301. The corresponding local clusters of the mobile device 301 at two geographic positions are indicated by circles in FIG. 9.

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

In the following, the look up procedure is described in more detail. When a data packet for a certain mobile device identification (ID) arrives at the gateway entity 200, e.g. the serving gateway 773 and/or a remote position database co-located with the serving gateway 773, the gateway entity 200, e.g. the serving gateway 773, can know a current geographic position and a predicted geographic position of the mobile device 301 from its own position table of the remote database associated to the gateway entity 200, realizing a proactive approach. Entries of the position table of the remote database associated to the gateway entity 200, e.g. serving gateway 773, can comprise a mapping between the mobile device identification (ID), the current geographic position, and/or the predicted geographic position of the mobile device 301.

If the current geographic position and the predicted geographic position coincide, it can mean that the mobile device 301 does not move and the gateway entity 200, e.g. the serving gateway 773, should send the data packet to a single or unique destination. If the geographic positions are different, the gateway entity 200, e.g. the serving gateway 773, can send a duplicated data packet through the communication network 303, e.g. the mesh backhaul network 705, towards two destinations. This can e.g. be performed by the communication interface 201 described in conjunction with FIG. 2.

If the position database is located in the gateway entity 200, e.g. a backhaul border gateway 731-735, the gateway entity 200, e.g. the serving gateway 773, can ask (1) a control entity, e.g. the mobility management entity 775, to provide position information, where the data packet should be sent to, realizing a reactive approach. The control entity, whose functionality can e.g. be added in the mobility management entity (MME) 775, can send a unicast position request to a backhaul border gateway 731-735, receive a position reply and forward it to the serving gateway 773. If there is more than one database, e.g. in backhaul border gateways 731-735 of the gateway entity 200, a position request (2) can be sent in parallel if an improved robustness is desired as illustrated in the figure. If the control entity, e.g. the mobility management entity (MME) 775, receives different position replies (3), it can choose a more up-to-date one to inform the serving gateway 773 (4).

Figure 10:
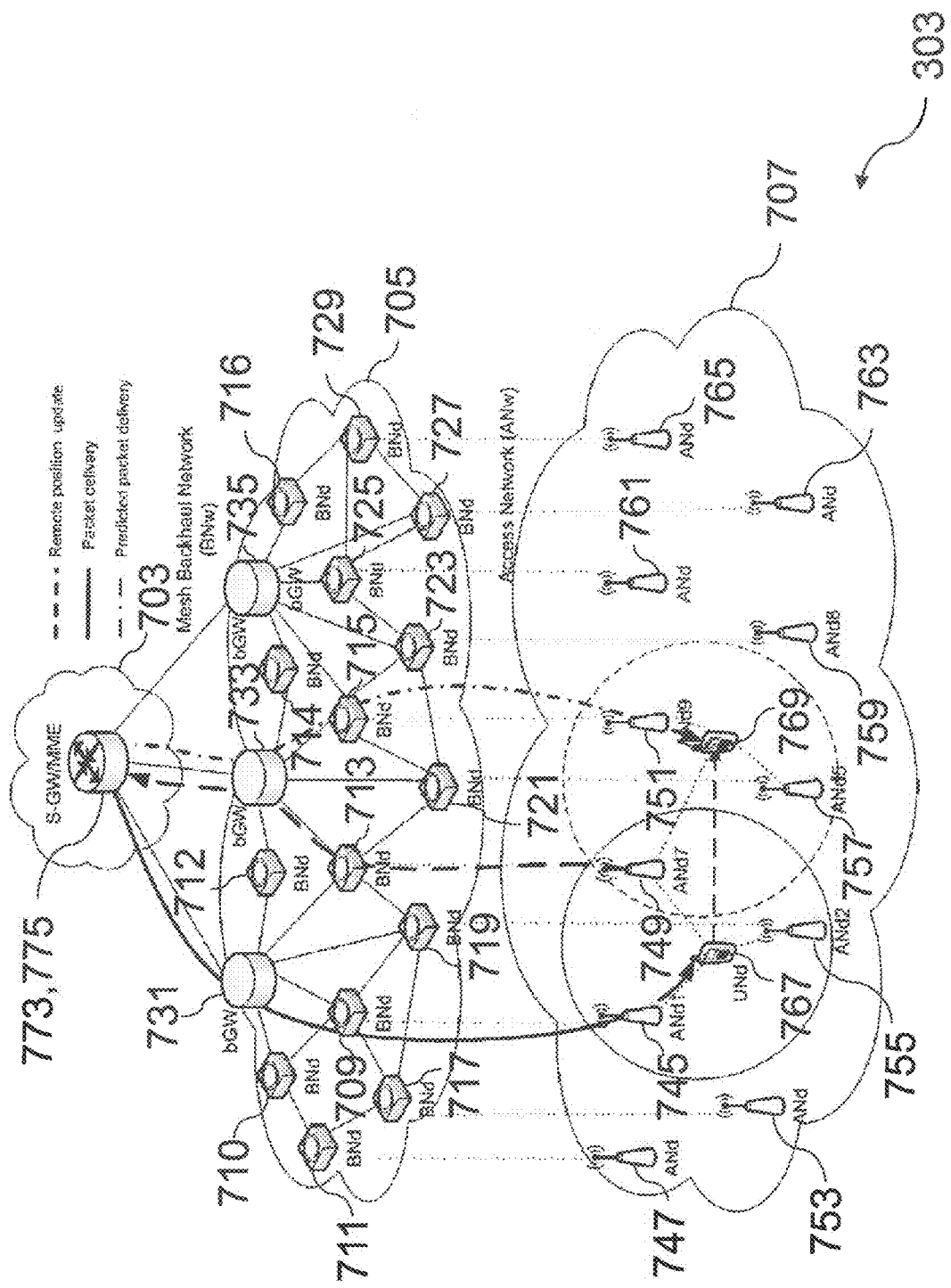
FIG. 10 shows a diagram of delivering a data packet to a mobile device over a communication network according to an embodiment.

FIG. 10 shows a diagram of delivering a data packet to a mobile device 301 over a communication network 303 according to an embodiment. The diagram illustrates a data packet delivery process.

The communication network 303 comprises a core network 703, a mesh backhaul network (BNw) 705, and an access network (ANw) 707. The core network 703 comprises a serving gateway 773, and a mobility management entity 775. The mesh backhaul network 705 comprises a plurality of backhaul nodes (BNds) 709-729, and a plurality of backhaul border gateways (bGWs) 731-735. The access network 707 comprises a plurality of access nodes (ANds) 745-765. A user node (UNd) 767-769 is attached to the access network 707.

The backhaul node 709 and the access node 745 can e.g. be comprised by the network entity 100. The backhaul node 711 and the access node 747 can e.g. be comprised by the further network entity 305. The backhaul node 713 and the access node 749 can e.g. be comprised by the further network entity 307. The backhaul node 715 and the access node 751 can e.g. be comprised by the further network entity 309.

The plurality of backhaul border gateways 731-735, the serving gateway 773, and the mobility management entity 775 can e.g. be comprised by the gateway entity 200. The user node 767-769 can e.g. be comprised by the mobile device 301. The corresponding local clusters of the mobile device 301 at two geographic positions are indicated by circles in FIG. 10.

The network entity 100 forms a possible implementation of the network entity 100 as described in conjunction with FIG. 1. The gateway entity 200 forms a possible implementation of the gateway entity 200 as described in conjunction with FIG. 2. The plurality of further network entities 305, 307, 309 form possible implementations of the network entity 100 as described in conjunction with FIG. 1.

The primary network entity 100, 305, 307, 309, e.g. the primary access node 745-765, can send the information about the position of the mobile device 301 to the remote database associated to the gateway entity 200 by means of position update packets as shown in FIG. 10 as dashed line. This can e.g. be performed by the communication interface 101 described in conjunction with FIG. 1. In this example, the position database is co-located with the gateway entity 200, e.g. the serving gateway 773.

When a mobile device 301 moves, its local cluster (LoCluster) as an aureole around it, can move together with it as depicted in the figure as a dotted circle. That is, network entities 100, 305, 307, 309, e.g. access nodes 745-765 and associated backhaul nodes 709-729, inside the aureole of the mobile device 301 can change. In this way, the local cluster (LoCluster) can enable a data packet diverting by means of network entities 100, 305, 307, 309, e.g. backhaul nodes 709-729, having routing capabilities to compensate the potentially outdated information received from the remote position database associated to the gateway entity 200. That is, an effective data packet delivery can be supported by means of the local cluster (LoCluster).

When the gateway entity 200, e.g. the serving gateway 773, receives a downlink data packet destined for an idle mobile device 301, e.g. by the communication interface 201 described in conjunction with FIG. 2, it can use the geographic coordinate of the destination from remote position database entries of the remote database associated to the gateway entity 200, which can e.g. be located in the serving gateway 773 or in backhaul border gateways 731-735, corresponding to the mobile device identification (ID). The gateway entity 200, e.g. the serving gateway 773, can append the geographic coordinate to a data packet header of the data packet to obtain a modified data packet, and send the modified data packet through intermediate network entities 100, 305, 307, 309, backhaul nodes 709-729, and/or backhaul border gateways 731, 733, 735, towards the mobile device 301 using an underlying geographic and/or topologic routing protocol. The modified data packet can be sent over a plurality of nodes between the gateway entity 200 and the mobile device 301. If both, the current geographic position and the predicted geographic position of the mobile device 301, are available and are not the same, the data packet can be sent to two different destinations using the modified data packet and a further modified data packet, e.g. directed to the current geographic position and the predicted geographic position respectively, for an improved reliability as illustrated in FIG. 10 as solid lines and dash-dotted lines.

The procedure for data packet delivery to the current geographic position of the mobile device 301 can be as follows. When an intermediate network entity 100, 305, 307, 309, e.g. backhaul node 709-729, receives a data packet, e.g. by the communication interface 101 described in conjunction with FIG. 1, it can first check whether the destination corresponds to a geographic position of a mobile device 301 attached to its in-lined access node 745-765. If this is the case, the data packet can be delivered. Otherwise, the network entity 100, 305, 307, 309, e.g. backhaul node 709-729, can check whether the destination mobile device identification (ID) is among its local position table entries of a local position database, e.g. a database 103 described in conjunction with FIG. 1, to appropriately divert the data packet. In this case, the destination geographic coordinate field in the data packet header of the data packet can be replaced and/or overwritten with a more up-to-date value obtained from the entry in the local position database table. Then, a geographic routing and/or geographic forwarding can deliver the data packet to the correct destination by following a trail of the mobile device 301, e.g. the user node 767, and/or its local cluster (LoCluster). On the other hand, if there is no entry for the destination mobile device identification (ID) in the local position database table, the data packet can be routed and/or forwarded based on its current geographic coordinate in the data packet header obtained from the remote position database associated to the gateway entity 200.

The procedure for data packet delivery to the predicted geographic position of the mobile device 301 can be as follows. When a data packet arrives at the predicted geographic position and the mobile device 301 and/or its local cluster (LoCluster) has reached the area, the data packet can be delivered by the same way as described above. Otherwise, the data packet can wait in a closest buffer, e.g. located in a processor 105 described in conjunction with FIG. 1, of a network entity 100, 305, 307, 309, e.g. backhaul node 709-729, a certain amount of time while the mobile device 301 can arrive to be delivered then. If a timer expires and the mobile device 301 has still not arrived, the data packet can be discarded. If a data packet header comprises not only predicted geographic coordinates, but also current geographic coordinates obtained from the remote database associated to the gateway entity 200, the network entity 100, 305, 307, 309, e.g. backhaul node 709-729, can, instead of keeping the data packet in the buffer, route and/or forward it to the current geographic position to meet the moving mobile device 301. As soon as the data packet reaches the local cluster (LoCluster) of the mobile device 301, it can be delivered.

After the mobile device 301 receives the data packet, a communication link between the mobile device 301 and a corresponding entity, e.g. the network entity 100, 305, 307, 309 or the gateway entity 200, can be established. If the mobile device 301 receives the same data packet twice by means of a current position and a predicted position data packet delivery procedure, one of the data packets can be discarded. When the mobile device 301 and the corresponding entity, e.g. the network entity 100, 305, 307, 309 or the gateway entity 200, communicate with each other, position tracking can be used by the gateway entity 200 or the communication network 303.

The network entities 100, 305, 307, 309 and/or the gateway entity 200 can enable an efficient data packet delivery to the mobile device 301 within the communication network 303 without using a paging procedure. Mobile communication networks can be deployed to provide a high data rate to an end-user to create the perception of an unlimited capacity. The quality of experience (QoE) of mobile device users should be similar to current home fiber network environments. A massive deployment of network entities 100, 305, 307, 309, e.g. small low power access nodes 745-765, in dense urban environments can meet these specifications.

Network entities 100, 305, 307, 309, e.g. small outdoor access nodes 745-765, may be located each 50-150 m apart, or even 20-50 m apart in streetlight deployment scenarios, and can work with or without macro network entity, e.g. macro base station, assistance. One of the ways to connect such massive numbers of network entities 100, 305, 307, 309, e.g. small access nodes 745-765, to a core network can be through a wired and/or wireless mesh backhaul network 705. Making these communication network domains operationally efficient can be a challenging task. Specifically, taking into account a common belief in the research community that, unlike in specific cellular communication networks, the paging procedure can be optional in future radio access networks (RAN) to simplify the architecture and to reduce the energy consumption of the mobile device 301. As a result, new mobility management and data packet delivery schemes are desired.

In general, mobility management can be split into two main functions, namely handoff or handover management, and location management. The former can deal with maintaining a seamless communication of the mobile devices while attaching or reattaching to a new network entity or attachment point, whilst the latter can deal with locating mobile devices in the communication network 303 when a communication is to be established or reestablished, i.e. the mobile device 301 can be in idle mode.

Embodiments can enable an efficient data packet delivery for an idle-mode mobile device 301 in a radio access network (RAN) comprising densely deployed network entities 100, 305, 307, 309, e.g. small access nodes 745-765 and a large scale mesh backhaul network 705, without using a paging procedure. An absence of paging and an application of a network entity 100, 305, 307, 309, e.g. an access node 745-765, inside a local cluster associated to the mobile device 301 can allow reducing the energy consumption of the mobile device 301 in this dense urban environment. Besides, the proposed location management mechanism can enable minimizing a position update signaling overhead throughout the communication network 303. The approach can also work in scenarios with mobile network entities 100, 305, 307, 309, e.g. access nodes 745-765, e.g. installed on a car or bus. In this case, the functionality of the network entity 100, 305, 307, 309, e.g. access node 745-765, can slightly be extended to send downlink beacon signals, e.g. by the communication interface 101 described in conjunction with FIG. 1, to form the local cluster (LoCluster) from neighboring network entities 100, 305, 307, 309.

Embodiments can realize an approach for location management in a dense outdoor radio access communication network that can enable data packet delivery to mobile devices. A paging procedure employed by the communication network 303 may be optional. When there are new data packets in the communication network 303 that are addressed to a mobile device 301 in idle mode and it is not known where the mobile device 301 is, for example, because the mobile device 301 has moved, the communication network 303 may not flood the network entities 100, 305, 307, 309, e.g. access nodes 745-765, with paging messages. Instead, the network entity 100, 305, 307, 309 that has received those data packets can redirect them to the last known position of the mobile device 301. The network entities 100, 305, 307, 309, e.g. access nodes 745-765, around that position can store for some time information about previously encountered mobile devices, e.g. in the database 103 described in conjunction with FIG. 1. This information can be sufficient to infer the direction in which the mobile device 301 has moved. Therefore, data packets approaching the destination can be routed and/or forwarded to the next hops on the trail of the moving mobile device 301 to reach it.

In order to make the location management more efficient, network entities 100, 305, 307, 309, e.g. access nodes 745-765, can periodically update the last known position of the mobile device 301 in a remote position management database associated to the gateway entity 200. This database can be consulted when a new data packet that is addressed to the mobile device 301 arrives to the dense outdoor radio access network. In addition to a time elapsed since the last update, the position updates can be based, for example, on a distance and/or a speed reached by the mobile device 301. The trigger for the updates can be inferred from a strength of a radio signal from that mobile device 301 received by the network entities 100, 305, 307, 309, e.g. access nodes 745-765, using uplink beacon signals. Since the gateway entity 200 or the communication network 303 can approximately know the position of the mobile device 301 and the direction in which the mobile device 301 moves, it can predict a future geographic position of the mobile device 301. In order to increase robustness, data packets arriving at the gateway entity 200 or the communication network 303 can be duplicated to be sent also towards predicted geographic positions to meet the moving mobile device 301 from the front. The operations described above can be implemented by means of a local cluster (LoCluster) that network entities 100, 305, 307, 309 that are near to the mobile device 301 form around that mobile device 301.

When the mobile device 301 moves, the local cluster can move together with the mobile device 301, i.e. the network entities 100, 305, 307, 309 inside the local cluster can change. Depending on the deployment scenario and the desired purposes, the local cluster may include network entities 100, 305, 307, 309, e.g. access nodes 745-765 and associated backhaul nodes 709-729, only access nodes 745-765, and/or access nodes 745-765 and associated virtual network elements e.g. in a remote data center in terms of a cloud radio access network (cloud RAN). The local cluster can comprise a network entity 100, 305, 307, 309 with a local position database, e.g. a database 103 described in conjunction with FIG. 1, comprising the current geographic position of the mobile device 301. Thresholds and triggers for position updates to local databases of the network entities 100, 305, 307, 309 and remote databases associated to the gateway entity 200 can be different in order to limit signaling overhead throughout the communication network 303.

When the gateway entity 200, e.g. serving gateway 773, receives a downlink data packet destined for an idle mobile device 301, it can derive the geographic position of the mobile device 301 from remote position database entries of a remote position database associated to the gateway entity 200, which may e.g. be located in the serving gateway 773 or in backhaul border gateways 731-735, corresponding to the mobile device identification (ID). The gateway entity 200, e.g. serving gateway 773, can append the geographic coordinate into the data packet header to obtain a modified data packet and can send the modified data packet through intermediate network entities 100, 305, 307, 309, e.g. backhaul nodes 709-729, towards the mobile device 301 using an underlying geographic routing protocol. When a data packet arrives from outside a radio access network, e.g. from an external Internet protocol (IP) network, and there is no geographical coordinate of the mobile device 301 in the arrived data packet's header, e.g. only an identification of the mobile device 301 is present in the data packet header, the gateway entity 200, e.g. the serving gateway 773, can insert the geographic coordinate of the mobile device 301 into the data packet header.

Figure 11:
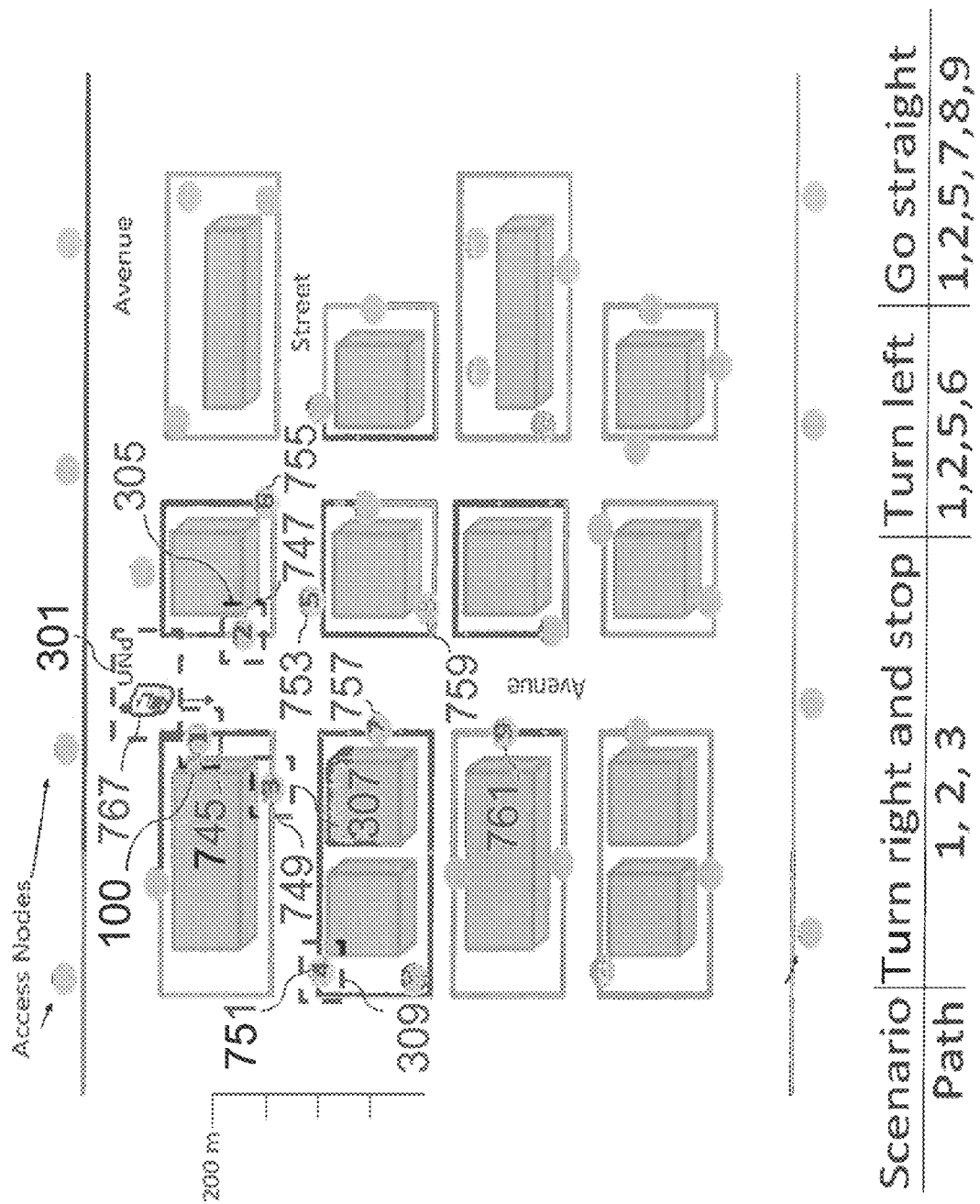
FIG. 11 shows a diagram of a deployment scenario of network entities and a mobile device according to an embodiment.

FIG. 11 shows a diagram of a deployment scenario of network entities 100, 305, 307, 309 and a mobile device 301 according to an embodiment. The diagram illustrates a deployment scenario with possible paths along which the mobile device 301 may move.

The diagram comprises a plurality of access nodes (ANd) 745-761, and a user node (UNd) 767. The network entity 100 can comprise an access node, e.g. the access node 745. The further network entity 305 can comprise an access node, e.g. the access node 747. The further network entity 307 can comprise an access node, e.g. the access node 749. The further network entity 309 can comprise an access node, e.g. the access node 751. The mobile device 301 can be formed by the user node 767.

The network entity 100 forms a possible implementation of the network entity 100 as described in conjunction with FIG. 1. The plurality of further network entities 305, 307, 309 form possible implementations of the network entity 100 as described in conjunction with FIG. 1.

If there is a prediction mobility mechanism in the communication network, a predicted geographic position of the mobile device 301 can be estimated when the mobile device 301 moves depending, for instance, on the speed of the mobile device 301, and/or a direction of movement of the mobile device 301. FIG. 11 illustrates a deployment scenario with possible paths along which the mobile device 301 may move.

Let us consider a scenario where the mobile device 301 moves straight. When the mobile device 301 firstly joins the communication network, it can send uplink beacon signals to network entities, e.g. the access nodes (ANd) 745, 747, 757, in its vicinity. The uplink beacon signals can e.g. be received by the communication interface 101 described in conjunction with FIG. 1. That is, network entities, e.g. access node ANd1 745, access node ANd2 747, access node ANd7 757, and associated backhaul nodes, can form the current local cluster (LoCluster) of the mobile device 301. The communication network or a gateway entity of the communication network can select a primary network entity, e.g. an access node, from the local cluster (LoCluster). This can be achieved by choosing the network entity, e.g. the access node, receiving the strongest beacon signal, e.g. access node ANd7 757, or the network entity, e.g. access node, predicted to have the lowest radio path loss within some time interval.

In a scenario where the path of the mobile device 301 turns to the right and stops, the access nodes 745, 747, 749 may be comprised by the local cluster (LoCluster). In a scenario where the path of the mobile device 301 turns to the left, the access nodes 745, 747, 753, 755 may be comprised by the local cluster (LoCluster). In a scenario where the path of the mobile device 301 goes straight, the access nodes 745, 747, 753, 757, 759, 761 may be comprised by the local cluster (LoCluster). The local cluster (LoCluster) may not comprise all indicated access nodes simultaneously. Firstly, it can comprise the access nodes 745, 747, 757. Then, as it moves, it can comprise the access nodes 747, 757, 759. After that, it can comprise the access nodes 757, 759, 761, etc. The local cluster (LoCluster) may comprise a predetermined number of access nodes, e.g. three access nodes.

FIG. 12 shows diagrams of a network entity 100 comprising an access node 745, 747 and a backhaul node 709 according to embodiments. The left diagram illustrates a logical association between the access node 745 and the backhaul node 709. The remaining diagrams illustrate physical associations between the access node 745, 747 and the backhaul node 709.

The network entity 100 forms a possible implementation of the network entity 100 as described in conjunction with FIG. 1.

In communication networks, the physical implementation of an access node 745, 747 and a backhaul node 709 can be realized using different variants. Some examples of possible implementations are illustrated in FIG. 12. For instance, a corresponding access node 745 and a backhaul node 709 may be collocated, i.e. reside on the same physical piece of infrastructure equipment, may have a one-to-multiple relationship, or may have a relay relationship. When a data packet reaches a corresponding backhaul node 709, e.g. a router, it can know how to deliver the data packet to an associated access node 745 or associated access nodes 745, 747 and vice versa.

The invention claimed is:

1. A network entity for geographically routing a data packet, the network entity comprising:
    a communication interface configured to receive a data packet over a communication network and extract a mobile device identification for a mobile device and a geographic coordinate indicating a geographic position of the mobile device from a header of the data packet;

a database configured to store entries that associate a plurality of stored mobile device identifications with a corresponding plurality of stored geographic coordinates indicating geographic positions of a plurality of mobile devices corresponding to the plurality of stored mobile device identifications, wherein each entry of the database associates a particular stored mobile device identification with a corresponding stored current geographic coordinate and a stored predicted geographic coordinate; and a processor configured to:
compare the mobile device identification extracted from the data packet with the plurality of entries stored in the database;
replace the geographic coordinate in the header of the data packet with a stored current geographic coordinate in a corresponding entry in the database that is associated with the mobile device identification for the mobile device to obtain a first modified data packet; and
replace the geographic coordinate in the header of the data packet with a stored predicted geographic coordinate in a corresponding entry in the database that is associated with the mobile device identification for the mobile device to obtain a second modified data packet;
wherein the communication interface is configured to transmit the first modified data packet and the second modified data packet towards two different destinations.

2. The network entity of claim 1, wherein the communication interface is configured to transmit the first modified data packet towards another network entity associated with the mobile device, based on the stored current geographic coordinate.

3. The network entity of claim 1, wherein the communication interface is configured to receive a beacon signal from the mobile device, wherein the processor is configured to determine a beacon mobile device identification and a beacon geographic coordinate of the mobile device based on the beacon signal, and wherein the processor is configured to store the determined beacon mobile device identification and the determined beacon geographic coordinate into an entry in the database.

4. The network entity of claim 1, wherein the communication network comprises a gateway entity, wherein the processor is configured to retrieve the mobile device identification for the mobile device and the stored current geographic coordinate from the corresponding entry in the database that is associated with the mobile device identification, and wherein the communication interface is configured to transmit the retrieved mobile device identification and the retrieved stored current geographic coordinate towards the gateway entity.

5. The network entity of claim 4, wherein the communication interface is configured to receive a request signal from the gateway entity, and wherein a requested mobile device identification and a requested geographic coordinate are retrieved from the entry in the database and transmitted towards the gateway entity upon reception of the request signal.

6. The network entity of claim 1, wherein the network entity comprises a backhaul node and an access node, wherein the backhaul node is configured to communicate with a plurality of network entities or a gateway entity of the communication network, and wherein the access node is configured to communicate with a number of mobile devices.

7. A gateway entity for geographically routing a data packet, the gateway entity comprising:
a communication interface configured to receive a data packet over a communication network and extract a mobile device identification for a mobile device and a geographic coordinate indicating a geographic position of the mobile device from a header of the data packet; and
a processor configured to:
compare the mobile device identification extracted from the data packet with a plurality of stored mobile device identifications associated with a plurality of mobile devices,
identify a current matching stored geographic coordinate and a predicted matching stored geographic coordinate associated with one of the plurality of stored mobile device identifications based on the mobile device identification extracted from the data packet, and
append the current matching stored geographic coordinate to the header of the data packet to obtain a first modified data packet; and
append the predicted matching stored geographic coordinate to the header of the data packet to obtain a second modified data packet;
wherein the communication interface is configured to transmit the first modified data packet and the second modified data packet towards two different destinations.

8. The gateway entity of claim 7, further comprising:
a database configured to store entries that associate each of the plurality of stored mobile device identifications with a corresponding current stored geographic coordinate and predicted stored geographic coordinate.

9. The gateway entity of claim 8, wherein the communication interface is configured to receive a second mobile device identification and a second current geographic coordinate from a network entity of the communication network, and wherein the processor is configured to store the received second mobile device identification and the received second current geographic coordinate into an entry in the database.

10. The gateway entity of claim 9, wherein the communication interface is configured to transmit a request signal towards the network entity.

11. A method for geographically routing a data, the method comprising:
receiving a data packet over a communication network;
extracting a mobile device identification of a mobile device from a header of the data packet;
comparing the mobile device identification extracted from the data packet with a plurality of stored mobile device identifications included in entries of a database to identify an entry that matches the mobile device identification;
replacing a geographic coordinate in the header of the data packet with a stored current geographic coordinate from the entry to obtain a first modified data packet;
replacing a geographic coordinate in the header of the data packet with a stored predicted geographic coordinate from the entry to obtain a second modified data packet; and
transmitting the first modified data packet and the second modified data packet towards two different destinations.

12. A method for geographically routing a data packet, the method comprising:
- receiving a data packet over a communication network;
- extracting a mobile device identification of a mobile device from the data packet;
- comparing the mobile device identification extracted from the data packet with a plurality of stored mobile device identifications included in entries of a database to identify an entry that matches the mobile device identification;
- appending a matching current stored geographic coordinate from the entry to the header of the data packet to obtain a first modified data packet;
- appending a matching predicted stored geographic coordinate from the entry to the header of the data packet to obtain a second modified data packet; and
- transmitting the first modified data packet and the second modified data packet towards two different destinations.

13. A non-transitory computer readable storage medium comprising a program code that, when executed by a computer, causes the computer to perform:
- receiving a data packet over a communication network;
- extracting a mobile device identification from a header of the data packet;
- comparing the mobile device identification extracted from the data packet with a plurality of stored mobile device identifications included in entries of a database to identify an entry that matches the mobile device identification;
- replacing a geographic coordinate in the header of the data packet with a stored current geographic coordinate from the entry to obtain a first modified data packet;
- replacing a geographic coordinate in the header of the data packet with a stored predicted geographic coordinate from the entry to obtain a second modified data packet; and
- transmitting the first modified data packet and the second modified data packet towards two different destinations.

14. A non-transitory computer readable storage medium comprising a program code that, when executed by a computer, causes the computer to perform:
- receiving a data packet over a communication network;
- extracting a mobile device identification from a header of the data packet;
- comparing the mobile device identification extracted from the data packet with a plurality of stored mobile device identifications included in entries of a database to identify an entry that matches the mobile device identification;
- appending a matching current stored geographic coordinate from the entry to the header of the data packet to obtain a first modified data packet;
- appending a matching predicted stored geographic coordinate from the entry to the header of the data packet to obtain a second modified data packet; and
- transmitting the first modified data packet and the second modified data packet towards two different destinations.

* * * * *